(12) United States Patent
Ito et al.

(10) Patent No.: US 10,302,170 B2
(45) Date of Patent: May 28, 2019

(54) DAMPER DEVICE

(71) Applicant: AISIN AW CO. LTD., Anjo-shi, Aichi-ken (JP)

(72) Inventors: Kazuyoshi Ito, Tsushima (JP); Keizo Araki, Hekinan (JP); Yuichiro Hirai, Okazaki (JP); Masaki Wajima, Anjo (JP); Makoto Ueno, Anjo (JP); Yuji Kanyama, Sabae (JP); Kotaro Tsuda, Fukui (JP)

(73) Assignee: AISIN AW CO. LTD., Anjo-shi, Aichi-ken (JP)

( * ) Notice: Subject to any disclaimer, the term of this patent is extended or adjusted under 35 U.S.C. 154(b) by 82 days.

(21) Appl. No.: 15/107,746

(22) PCT Filed: Feb. 27, 2015

(86) PCT No.: PCT/JP2015/055938
§ 371 (c)(1),
(2) Date: Jun. 23, 2016

(87) PCT Pub. No.: WO2015/129885
PCT Pub. Date: Sep. 3, 2015

(65) Prior Publication Data
US 2016/0356340 A1 Dec. 8, 2016

(30) Foreign Application Priority Data

Feb. 28, 2014 (JP) .................................. 2014-039655
Jun. 24, 2014 (JP) .................................. 2014-129301

(51) Int. Cl.
*F16F 15/121* (2006.01)
*F16F 15/123* (2006.01)
*F16F 15/14* (2006.01)

(52) U.S. Cl.
CPC .... *F16F 15/12366* (2013.01); *F16F 15/1428* (2013.01); *Y10T 74/2131* (2015.01)

(58) Field of Classification Search
CPC ............ Y10T 74/2131; F16F 15/12366; F16F 15/134; F16F 15/14; F16F 15/1428
(Continued)

(56) References Cited

U.S. PATENT DOCUMENTS

| 4,569,668 A | * | 2/1986 | Fukushima | .......... F16F 15/1428 |
| 8,403,762 B2 | * | 3/2013 | Steinberger | ....... F16F 15/13492 |
| | | | | 192/3.29 |

(Continued)

FOREIGN PATENT DOCUMENTS

| JP | 2006-118534 A | 5/2006 |
| JP | 2011-214635 A | 10/2011 |

(Continued)

OTHER PUBLICATIONS

International Search Report for PCT/JP2015/055938 dated May 26, 2015.

*Primary Examiner* — Greg Binda
(74) *Attorney, Agent, or Firm* — Sughrue Mion, PLLC

(57) ABSTRACT

A dynamic damper is coupled to an intermediate member of a damper device. A drive member of the damper device has additional abutment portions coupled to end portions of vibration absorption springs of the dynamic damper before both first and second inter-element stoppers operate. The second inter-element stoppers operate before the first inter-element stoppers operate and at least by the time when the additional coupling portions are coupled to end portions of the vibration absorption springs. Outer springs and the vibration absorption springs act in parallel to transfer torque after the additional coupling portions are coupled to end portions of the vibration absorption springs.

20 Claims, 14 Drawing Sheets

(58) Field of Classification Search
USPC ............ 464/68.8, 67.1; 192/3.29, 213, 213.2
See application file for complete search history.

(56) References Cited

U.S. PATENT DOCUMENTS

| | | |
|---|---|---|
| 2009/0125202 A1 | 5/2009 | Swank et al. |
| 2015/0276013 A1* | 10/2015 | Kawazoe .......... F16F 15/13484 |
| 2017/0045113 A1* | 2/2017 | Ito ............................. F16D 3/12 |
| 2017/0175849 A1* | 6/2017 | Ito .................... F16F 15/12353 |

FOREIGN PATENT DOCUMENTS

| | | |
|---|---|---|
| JP | 2013-072539 A | 4/2013 |
| WO | 2011/076168 A | 6/2011 |

* cited by examiner

DAMPER DEVICE

CROSS REFERENCE TO RELATED APPLICATIONS

This application is a National Stage of International Application No. PCT/JP2015/055938 filed Feb. 27, 2015, claiming priority based on Japanese Patent Application Nos. 2014-039655 filed Feb. 28, 2014 and 2014-129301 filed Jun. 24, 2014, the contents of all of which are incorporated herein by reference in their entirety.

TECHNICAL FIELD

The present disclosure relates to a damper device that has a plurality of rotary elements that include at least an input element and an output element, a torque transfer elastic body that transfers torque between the plurality of rotary elements, and a dynamic damper coupled to one of the plurality of rotary elements.

BACKGROUND ART

There has hitherto been known a damper device that includes a first elastic body that transfers torque between an input element and an output element, a second elastic body disposed on the inner side of the first elastic body to transfer torque between the input element and the output element, and a dynamic damper that has a vibration absorption elastic body coupled to any of rotary elements that constitute the damper device and a mass body coupled to the vibration absorption elastic body (see Patent Document 1, for example). In the damper device, the vibration absorption elastic body which constitutes the dynamic damper is disposed on the outer side or the inner side, in the radial direction, of the first and second elastic bodies, or between the first elastic body and the second elastic body in the radial direction.

There has also hitherto been known a fluid transmission apparatus that includes a pump impeller connected to an input member, a turbine runner that is rotatable coaxially with the pump impeller, a damper mechanism connected to an output member, a lock-up clutch that engages the input member and an input element of the damper mechanism with each other, an elastic body disposed between the turbine runner and a first element, which is any one of a plurality of elements that constitute the damper mechanism, so as to abut against the turbine runner and the first element, and an engagement mechanism disposed between the turbine runner and a second element, which is one of the elements which constitute the damper mechanism other than the first element, to engage the turbine runner and the second element with each other so as to rotate together with each other (see Patent Document 2, for example). In the fluid transmission apparatus, when the input member and the input element of the damper mechanism are engaged with each other by the lock-up clutch, the elastic body constitutes a dynamic damper together with the turbine runner which serves as a mass that does not contribute to torque transfer between the input member and the output member. When the turbine runner and the second element are engaged with each other by the engagement mechanism to rotate together with each other, in addition, the elastic body between the turbine runner and the first element functions as a damper that absorbs torque between the input member and the output member. Consequently, in the fluid transmission apparatus, the elastic body between the turbine runner and the first element can be used as both an elastic body for the dynamic damper and an elastic body that absorbs excessive torque input to the input member.

RELATED-ART DOCUMENTS

Patent Documents

[Patent Document 1] International Patent Application Publication No. 2011/076168
[Patent Document 2] Japanese Patent Application Publication No. 2011-214635 (JP 2011-214635 A)

SUMMARY

By incorporating the dynamic damper with the damper device as in the example according to the related art described in Patent Document 1, it is possible to damp vibration at a predetermined frequency by applying vibration in the opposite phase to any one of the rotary elements which constitute the damper device using the dynamic damper. However, incorporating the dynamic damper with the damper device does not itself provide the entire damper device with lower rigidity (a longer stroke). Thus, the damper device according to the related art which has a dynamic damper still has room for improvement in terms of providing further lower rigidity. Meanwhile, Patent Document 2 describes enhancing the spring constant of the elastic body for the dynamic damper so that the elastic body can also be used as an elastic body that absorbs excessive torque input to the input member, but does not describe at all lowering the rigidity of the damper device.

It is therefore a main object of the present disclosure to further lower the rigidity of a damper device that has a dynamic damper.

The present disclosure provides a damper device that includes a plurality of rotary elements that include at least an input element and an output element, torque transfer elastic bodies that include at least first and second elastic bodies that act in series between the input element and the output element to transfer torque, and a dynamic damper that includes a mass body and a vibration absorption elastic body disposed between the mass body and a first rotary element that is one of the plurality of rotary elements and that damps vibration by applying vibration in the opposite phase to the first rotary element, by including: a rotation restriction stopper that restricts relative rotation between the input element and the output element; an additional coupling portion provided to a second rotary element that is one of the plurality of rotary elements to which the dynamic damper is not coupled and configured to be coupled to an end portion of the vibration absorption elastic body before relative rotation between the input element and the output element is restricted by the rotation restriction stopper; and an elastic body stopper that restricts torsion of one of the first and second elastic bodies before relative rotation between the input element and the output element is restricted by the rotation restriction stopper and at least by the time when the additional coupling portion is coupled to the end portion of the vibration absorption elastic body, in which the vibration absorption elastic body and the other of the first and second elastic bodies act in parallel between the input element and the output element to transfer torque after the additional coupling portion is coupled to the end portion of the vibration absorption elastic body.

In the damper device, the dynamic damper which includes the mass body and the vibration absorption elastic body which is disposed between the mass body and the first rotary element which is one of the plurality of rotary elements is coupled to the first rotary element. In addition, the second rotary element which is one of the plurality of rotary elements to which the dynamic damper is not coupled has the additional coupling portion which is configured to be coupled to an end portion of the vibration absorption elastic body before relative rotation between the input element and the output element is restricted by the rotation restriction stopper. The damper device further has the elastic body stopper which restricts torsion of one of the first and second elastic bodies before relative rotation between the input element and the output element is restricted by the rotation restriction stopper and at least by the time when the additional coupling portion is coupled to the end portion of the vibration absorption elastic body. The vibration absorption elastic body and the other of the first and second elastic bodies act in parallel between the input element and the output element to transfer torque after the additional coupling portion is coupled to the end portion of the vibration absorption elastic body. Consequently, the rigidity of the one of the first and second elastic bodies, which does not transfer torque at least after the additional abutment portion is coupled to the end portion of the vibration absorption elastic body, can be further lowered, and torque to be carried by (distributed to) the other of the first and second elastic bodies which acts in parallel with the vibration absorption elastic body can be reduced to further lower the rigidity of the other of the first and second elastic bodies. Thus, according to the present disclosure, it is possible to further lower the rigidity of the damper device which has the dynamic damper.

DETAILED DESCRIPTION OF THE PREFERRED EMBODIMENTS

Now, an embodiment of the present disclosure will be described with reference to the drawings.

Figure 1:
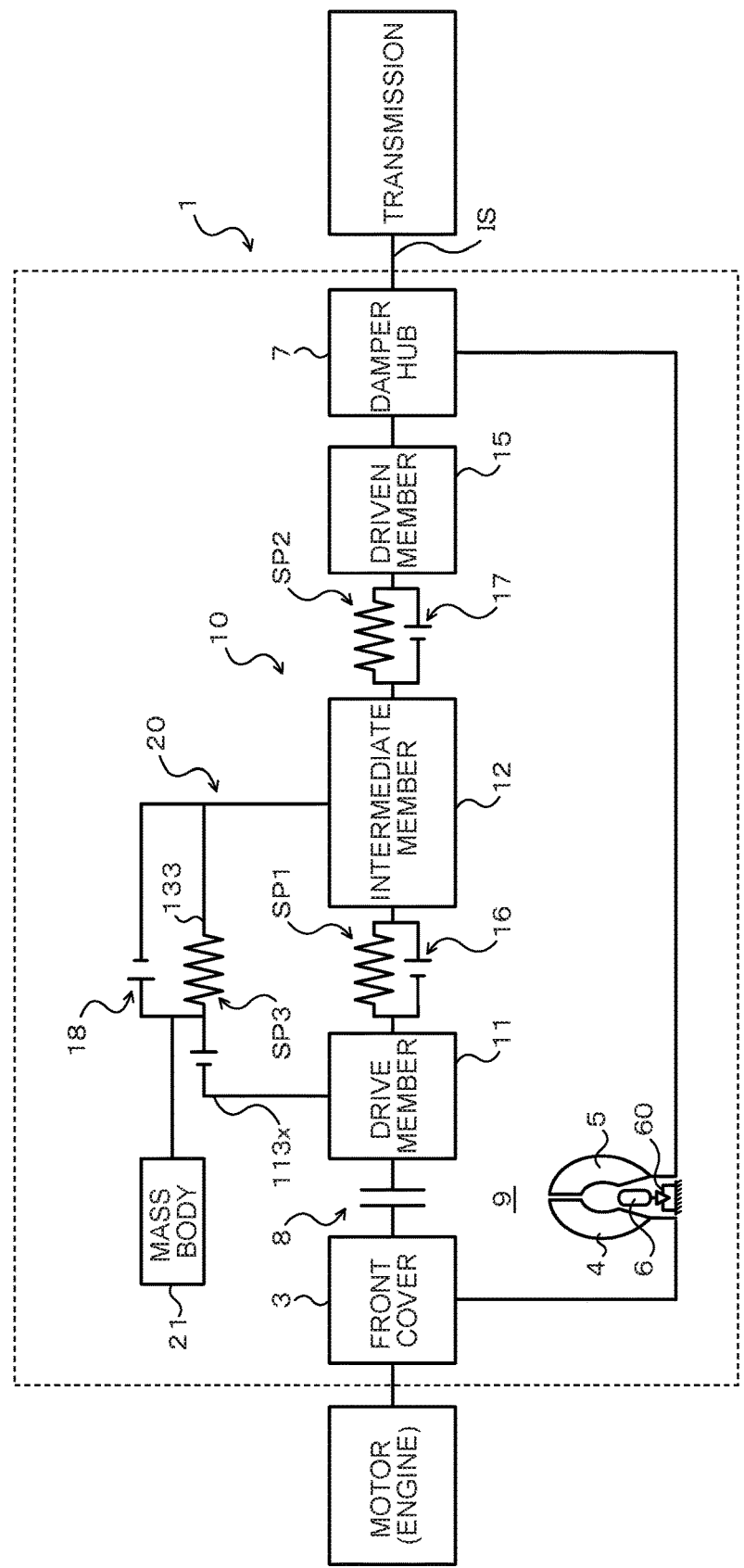
FIG. 1 is a schematic configuration diagram illustrating a starting device that includes a damper device according to an embodiment of the present disclosure.

FIG. 1 is a schematic configuration diagram illustrating a starting device 1 that includes a damper device 10 according to an embodiment of the present disclosure. The starting device 1 illustrated in the drawing is mounted on a vehicle that includes an engine (internal combustion engine) that serves as a motor. In addition to the damper device 10, the starting device 1 includes: a front cover 3 that serves as an input member coupled to a crankshaft of the engine; a pump impeller (input-side fluid transmission element) 4 fixed to the front cover 3; a turbine runner (output-side fluid transmission element) 5 that is coaxially rotatable with the pump impeller 4; a damper hub 7 that serves as an output member coupled to the damper device 10 and fixed to an input shaft IS of a transmission that is an automatic transmission (AT) or a continuously variable transmission (CVT); a lock-up clutch 8 which is a single-plate hydraulic clutch; a dynamic damper 20 coupled to the damper device 10; and so forth.

The pump impeller 4 has a pump shell (not illustrated) tightly fixed to the front cover 3, and a plurality of pump blades (not illustrated) disposed on the inner surface of the pump shell. The turbine runner 5 has a turbine shell (not illustrated), and a plurality of turbine blades (not illustrated) disposed on the inner surface of the turbine shell. In the embodiment, the inner peripheral portion of the turbine shell of the turbine runner 5 is fixed to the damper hub 7 via a plurality of rivets. The pump impeller 4 and the turbine runner 5 face each other. A stator 6 is disposed between and coaxially with the pump impeller 4 and the turbine runner 5. The stator 6 rectifies a flow of working oil (working fluid) from the turbine runner 5 to the pump impeller 4. The stator 6 has a plurality of stator blades. The rotational direction of the stator 6 is set to only one direction by a one-way clutch 60. The pump impeller 4, the turbine runner 5, and the stator 6 form a torus (annular flow passage) that allows circulation of working oil, and function as a torque converter (fluid transmission apparatus) with a torque amplification function. It should be noted, however, that the stator 6 and the one-way clutch 60 may be omitted from the starting device 1, and that the pump impeller 4 and the turbine runner 5 may function as a fluid coupling.

Figure 2:
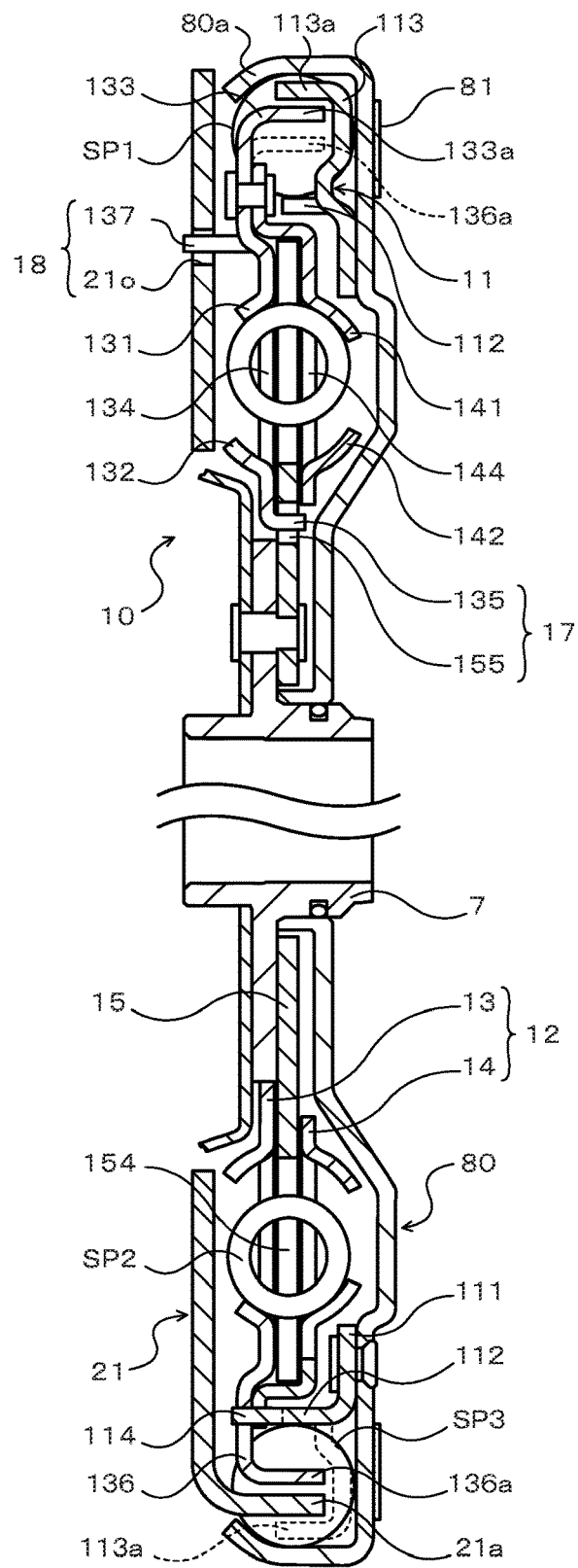
FIG. 2 is a sectional view illustrating the damper device which is included in the starting device of FIG. 1.

The lock-up clutch 8 can establish and release lock-up in which the front cover 3 and the damper hub 7 are coupled to each other via the damper mechanism 10. The lock-up clutch 8 has a lock-up piston 80 disposed inside the front cover 3 and in the vicinity of the inner wall surface of the front cover 3 on the engine side, and fitted so as to be movable in the axial direction and rotatable with respect to the damper hub 7. As illustrated in FIG. 2, a friction material 81 is affixed to a surface of the lock-up piston 80 on the outer peripheral side and on the front cover 3 side. A lock-up chamber (not illustrated) is defined between the lock-up piston 80 and the front cover 3. The lock-up chamber is connected to a hydraulic control device (not illustrated) via a working oil supply hole and an oil passage formed in the input shaft IS.

Working oil to be supplied from the hydraulic control device to the pump impeller 4 and the turbine runner 5 (torus) can flow into the lock-up chamber. Thus, if the pressure in a fluid transmission chamber 9 defined by the front cover 3 and the pump shell of the pump impeller 4 and the pressure in the lock-up chamber are kept equal to each other, the lock-up piston 80 is not moved toward the front cover 3, and the lock-up piston 80 is not frictionally engaged with the front cover 3. If the pressure in the lock-up chamber is decreased by the hydraulic control device (not illustrated), in contrast, the lock-up piston 80 is moved toward the front cover 3 by a pressure difference to be frictionally engaged with the front cover 3. Consequently, the front cover 3 is coupled to the damper hub 7 via the damper device 10. The lock-up clutch 8 may be constituted as a multi-plate hydraulic clutch.

As illustrated in FIGS. 1 and 2, the damper device 10 includes: a drive member (input element) 11, an intermediate member (intermediate element) 12, and a driven member (output element) 15 as rotary elements; and a plurality of (in the embodiment, two) outer springs (outer (first) elastic bodies) SP1 disposed in proximity to the outer periphery of the damper device 10 and a plurality of (in the embodiment, six) inner springs (inner (second) elastic bodies) SP2 disposed on the inner side with respect to the outer springs SP1 as torque transfer elements (torque transfer elastic bodies).

In the embodiment, the outer springs SP1 are arc coil springs made of a metal material wound so as to have an axis that extends in an arc shape when no load is applied. Consequently, the outer springs SP1 are provided with lower rigidity (a smaller spring constant), and the damper device 10 is provided with lower rigidity (a longer stroke). In the embodiment, in addition, the inner springs SP2 are linear coil springs made of a metal material spirally wound so as to have an axis that extends straight when no load is applied, and have higher rigidity (a larger spring constant) than that of the outer springs SP1. It should be noted, however, that linear coil springs may be adopted as the outer springs SP1, that arc coil springs may be adopted as the inner springs SP2, and that springs that have lower rigidity (a smaller spring constant) than that of the outer springs SP1 may be adopted as the inner springs SP2.

The drive member 11 is formed in an annular shape, and has: an annular fixed portion 111 fixed to the lock-up piston 80 of the lock-up clutch 8 via a plurality of rivets; a plurality of (in the embodiment, two) spring support portions 112 that extend in the axial direction from the outer peripheral portion of the fixed portion 111 toward the pump impeller 4 and the turbine runner 5 and that support (guide) the inner peripheral portion of the plurality of outer springs SP1; and a plurality of (in the embodiment, four) spring abutment portions (input abutment portions) 113 that extend from the outer peripheral portion of the fixed portion 111 toward the radially outer side at intervals in the circumferential direction and that include tab portions 113a that extend in the axial direction toward the pump impeller 4 and the turbine runner 5 on the radially outer side with respect to the spring support portions 112. The drive member 11 is fixed to the lock-up piston 80, and disposed in the outer peripheral region in the fluid transmission chamber 9.

Figure 3:
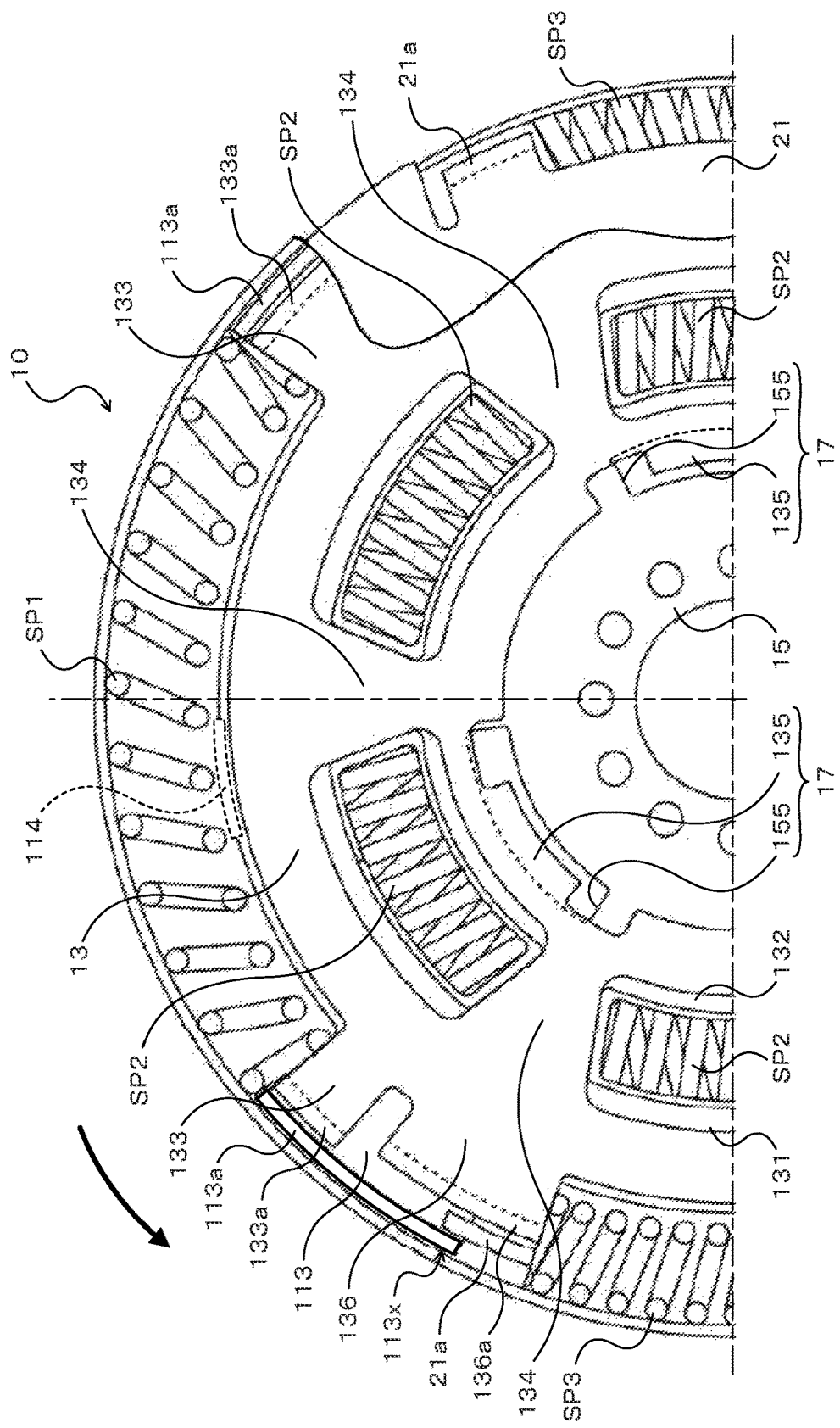
FIG. 3 is a front view illustrating the damper device which is included in the starting device of FIG. 1.

In the embodiment, in addition, the lock-up piston 80 has an annular spring support portion 80a that supports (guides) the outer peripheral portion of the plurality of outer springs SP1 and side portions of the plurality of outer springs SP1 on the turbine runner 5 side (transmission side) (side portions on the left side in FIG. 2). The plurality of outer springs SP1 are supported by the spring support portions 112 of the drive member 11 discussed above and the spring support portion 80a of the lock-up piston 80, and disposed in the outer peripheral region in the fluid transmission chamber 9 in proximity to the outer periphery of the damper device 10. Further, with the damper device 10 attached, as illustrated in FIG. 3, the spring abutment portions 113 of the drive member 11 abut against end portions of the corresponding outer springs SP1. That is, two spring abutment portions 113 paired with each other face each other at an interval that matches the natural length of the outer springs SP1, for example, and, with the damper device 10 attached, both end portions of each of the outer springs SP1 abut against the corresponding spring abutment portions 113 of the drive member 11.

The intermediate member 12 includes: an annular first intermediate plate member 13 disposed on the side of the pump impeller 4 and the turbine runner 5; and an annular second intermediate plate member 14 disposed on the lock-up piston 80 (front cover 3) side and coupled (fixed) to the first intermediate plate member 13 via rivets.

As illustrated in FIGS. 2 and 3, the first intermediate plate member 13 which constitutes the intermediate member 12 has: a plurality of (in the embodiment, six) spring support portions 131 that are arranged side by side at intervals in the circumferential direction and that support (guide) side portions of the corresponding inner springs SP2 on the side of the pump impeller 4 and the turbine runner 5 from the outer side; and a plurality of (in the embodiment, six) spring support portions 132 that are arranged side by side at intervals in the circumferential direction on the inner peripheral side of the first intermediate plate member 13 with respect to the plurality of spring support portions 131 and that support (guide) side portions of the corresponding inner springs SP2 on the side of the pump impeller 4 and the turbine runner 5 from the inner side. The first intermediate plate member 13 further has: a plurality of (in the embodiment, four) first outer spring abutment portions (first abutment portions) 133 that extend away from the spring support portions 131 toward the radially outer side at intervals in the circumferential direction and that include tab portions 133a that extend in the axial direction toward the lock-up piston 80; and a plurality of (in the embodiment, six) inner spring abutment portions 134 provided between the spring support portions 131 and 132 which are adjacent to each other along the circumferential direction.

As illustrated in FIGS. 2 and 3, the second intermediate plate member 14 which constitutes the intermediate member 12 has: a plurality of (in the embodiment, six) spring support portions 141 that are arranged side by side at intervals in the circumferential direction and that support (guide) side portions of the corresponding inner springs SP2 on the lock-up piston 80 side from the outer side; and a plurality of (in the embodiment, six) spring support portions 142 that are arranged side by side at intervals in the circumferential direction and that support (guide) side portions of the corresponding inner springs SP2 on the lock-up piston 80 side from the inner side. The second intermediate plate member 14 further has a plurality of (in the embodiment, six) inner spring abutment portions 144 provided between the spring support portions 141 and 142 which are adjacent to each other along the circumferential direction.

When the first and second intermediate plate members 13 and 14 are coupled to each other, the spring support portions 131 of the first intermediate plate member 13 face the corresponding spring support portions 141 of the second intermediate plate member 14, and the spring support portions 132 of the first intermediate plate member 13 face the corresponding spring support portions 142 of the second intermediate plate member 14. The plurality of inner springs SP2 are supported by the spring support portions 131 and 141 which face each other and the spring support portions 132 and 142 which face each other, arranged side by side with the plurality of outer springs SP1 in the radial direction (overlap with the plurality of outer springs SP1 as seen from the radial direction), and disposed on the inner side with respect to the plurality of outer springs SP1 in proximity to the input shaft IS.

In addition, with the damper device 10 attached, as illustrated in FIG. 3, the first outer spring abutment portions 133 of the first intermediate plate member 13 abut against end portions of the corresponding outer springs SP1. That is, two first outer spring abutment portions 133 paired with each other face each other at an interval that matches the natural length of the outer springs SP1, for example, and, with the damper device 10 attached, both end portions of each of the outer springs SP1 abut against the corresponding first outer spring abutment portions 133 of the first intermediate plate member 13. In the embodiment, as illustrated in the drawing, the tab portions 133a of the first outer spring abutment portions 133 of the first intermediate plate member 13 and the tab portions 113a of the spring abutment portions 113 of the drive member 11 are arranged side by side in the radial direction, and the tab portions 133a of the first outer spring abutment portions 133 abut against end portions of the corresponding outer springs SP1 on the radially inner side with respect to the tab portions 113a of the spring abutment portions 113. Further, the inner spring abutment portions 134 of the first intermediate plate member 13 are each provided between the inner springs SP2 which are adjacent to each other to abut against end portions of two adjacent the inner springs SP2, and the inner spring abutment portions 144 of the second intermediate plate member 14 are each provided between the inner springs SP2 which are adjacent to each other to abut against end portions of the two adjacent inner springs SP2 (see FIG. 2). That is, with the damper device 10 attached, both end portions of each of the inner springs SP2 abut against the corresponding inner spring abutment portions 134 and 144 of the first and second intermediate plate members 13 and 14.

As illustrated in FIG. 2, the driven member 15 is disposed between the first intermediate plate member 13 and the second intermediate plate member 14 of the intermediate member 12, and fixed to the damper hub 7 via a plurality of rivets. In addition, the driven member 15 has a plurality of (in the embodiment, six) spring abutment portions 154 formed at intervals in the circumferential direction to extend toward the radially outer side, and each disposed between the inner springs SP2 which are adjacent to each other to abut against end portions of the two adjacent inner springs SP2. That is, with the damper device 10 attached, both end portions of each of the inner springs SP2 abut against the corresponding spring abutment portions 154 of the driven member 15. Consequently, the driven member 15 is coupled to the drive member 11 via the plurality of outer springs SP1, the intermediate member 12, and the plurality of inner springs SP2.

The damper device 10 further includes, as rotation restriction stoppers that restrict relative rotation between the drive member 11 and the driven member 15: a first inter-element stopper 16 that restricts relative rotation between the drive member 11 and the intermediate member 12; and a second inter-element stopper (elastic body stopper) 17 that restricts relative rotation between the intermediate member 12 and the driven member 15. As illustrated in FIG. 2, the first inter-element stopper 16 is composed of: a stopper portion 114 formed on the drive member 11 by further extending a part of the spring support portions 112 in the axial direction toward the pump impeller 4 and the turbine runner 5; and a pair of first outer spring abutment portions 133 of the first intermediate plate member 13 that face each other via the outer spring SP1. In the embodiment, two first inter-element stoppers 16 are provided, with the stopper portion 114 formed in each spring support portion 112 of the drive member 11.

Figure 4:
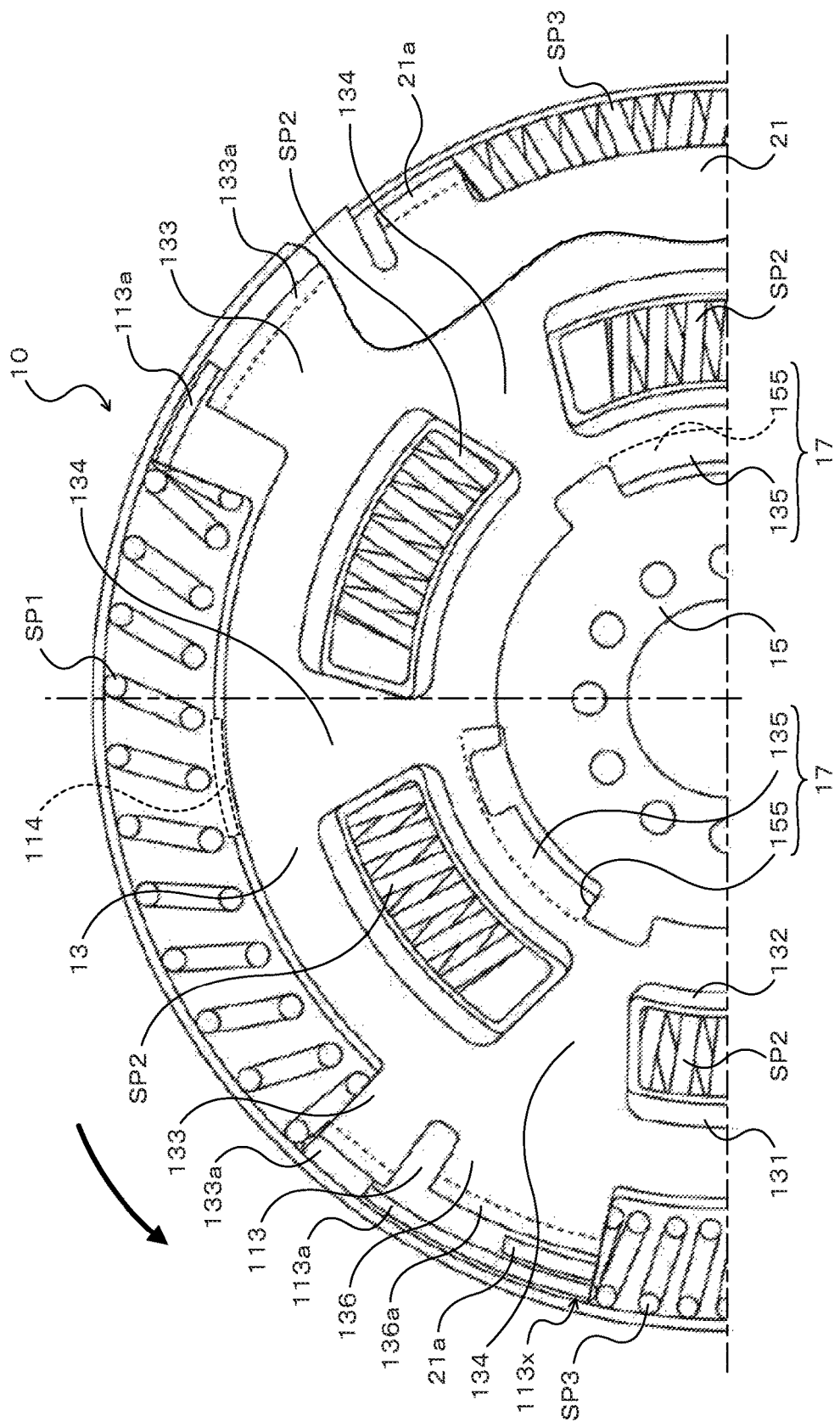
FIG. 4 is a front view illustrating the damper device which is included in the starting device of FIG. 1.

With the damper device 10 attached, as illustrated in FIGS. 3 and 4, the stopper portion 114 of the drive member 11 is disposed between a pair of first outer spring abutment portions 133 of the first intermediate plate member 13, which face each other via the outer spring SP1, so as not to abut against the side surfaces of the first outer spring abutment portions 133. When the stopper portion 114 of the drive member 11 abuts against the side surface of one of the first outer spring abutment portions 133 on both sides along with relative rotation between the drive member 11 and the intermediate member 12, torsion (expansion and contraction) of the outer springs SP1 and relative rotation between the drive member 11 and the intermediate member 12 are restricted.

The second inter-element stopper 17 is composed of: a stopper portion 135 that extends in the axial direction from the inner peripheral portion of the first intermediate plate member 13; and an arc-shaped opening portion 155 formed in the driven member 15. In the embodiment, a plurality of second inter-element stoppers 17 are provided by providing a plurality of stopper portions 135 to the first intermediate plate member 13 and providing a number of opening portions 155 in the driven member 15, the number being the same as that of the stopper portions 135. With the damper device 10 attached, as illustrated in FIG. 3, the stopper portion 135 of the first intermediate plate member 13 is inserted into the corresponding opening portion 155 of the driven member 15 so as not to abut against inner wall surfaces on both sides that define the opening portion 155. As illustrated in FIG. 4, when the stopper portion 135 on the intermediate member 12 side abuts against one of the inner wall surfaces of the opening portion 155 positioned on both sides along with relative rotation between the intermediate member 12 and the driven member 15, torsion (expansion and contraction) of the inner springs SP2 and relative rotation between the intermediate member 12 and the driven member 15 are restricted.

Consequently, when torsion of the outer springs SP1 and relative rotation between the drive member 11 and the intermediate member 12 are restricted by the first inter-element stoppers 16 and torsion of the inner springs SP2 and relative rotation between the intermediate member 12 and the driven member 15 are restricted by the second inter-element stoppers 17, relative rotation between the drive member 11 and the driven member 15 is restricted. In the embodiment, in addition, the first inter-element stoppers 16 (the specifications of the drive member 11, the intermediate member 12, and the outer springs SP1) and the second inter-element stoppers 17 (the specifications of the intermediate member 12, the driven member 15, and the inner springs SP2) are configured (set) such that torsion of the inner springs SP2 and relative rotation between the intermediate member 12 and the driven member 15 are restricted by the second inter-element stoppers 17 before torsion of the outer springs SP1 and relative rotation between the drive member 11 and the intermediate member 12 are restricted by the first inter-element stoppers 16 along with an increase in input torque.

The dynamic damper 20 includes: an annular mass body 21; and a plurality of vibration absorption springs (vibration absorption elastic bodies) SP3 that are linear coil springs or arc coil springs (in the embodiment, two linear coil springs) disposed between the mass body 21 and the intermediate member (first rotary element) 12 which is a rotary element of the damper device 10. The "dynamic damper" is a mechanism that damps vibration of a vibrating body by applying, to the vibrating body, vibration in the opposite phase at a frequency (engine rotational speed) that coincides with the resonance frequency of the vibrating body, and is constituted by coupling a spring (elastic body) and a mass body to the vibrating body (in the embodiment, the intermediate member 12) such that the spring and the mass body are not included in the torque transfer path. That is, vibration at a desired frequency can be damped by the dynamic damper 20 by adjusting the rigidity of the vibration absorption springs SP3 and the weight of the mass body 21.

The mass body 21 of the dynamic damper 20 has a plurality of (in the embodiment, four) spring abutment portions (elastic body abutment portions) 21a that extend in the axial direction from the outer peripheral portion at intervals in the circumferential direction. The plurality of spring abutment portions 21a are formed symmetrically with respect to the axis of the mass body 21 such that two (a pair of) spring abutment portions 21a are proximate to each other. The two spring abutment portions 21a which are paired with each other face each other at an interval that matches the natural length of the vibration absorption springs SP3, for example. In addition, the first intermediate plate member 13 of the intermediate member 12, to which the dynamic damper 20 is coupled, has a plurality of (in the embodiment, four) second outer spring abutment portions (second abutment portions) 136 that extend away from the spring support portions 131 toward the radially outer side at intervals in the circumferential direction and that include tab portions 136a that extend in the axial direction toward the lock-up piston 80. The plurality of second outer spring abutment portions 136 are formed symmetrically with respect to the axis of the first intermediate plate member 13 between the first outer spring abutment portions 133 which are adjacent to each other not via the outer spring SP1 such that two (a pair of) second outer spring abutment portions 136 are proximate to each other. The two second outer spring abutment portions 136 which are paired with each other face each other at an interval that matches the natural length of the vibration absorption springs SP3, for example.

With the damper device 10 attached, the vibration absorption springs SP3 are each supported by a pair of spring abutment portions 21a, and each disposed between two outer springs SP1 which are adjacent to each other so as to be arranged side by side with the outer springs SP1 in the circumferential direction. That is, both end portions of each of the vibration absorption springs SP3 abut against the corresponding spring abutment portions 21a of the mass body 21, and the vibration absorption springs SP3 overlap the outer springs SP1 in the axial direction and a portion of the springs SP3 and SP1 lie at the same radial distance from an axis of the starting device 1 and the damper device 10. In this way, with the vibration absorption springs SP3 which constitute the dynamic damper 20 disposed in proximity to the outer periphery of the damper device 10 so as to be arranged side by side with the outer springs SP1 in the circumferential direction, an increase in outside diameter of the damper device 10 can be suppressed to make the entire device compact compared to a case where the vibration absorption springs SP3 are disposed on the outer side or the inner side, in the radial direction, of the outer springs SP1 and the inner springs SP2 or between the outer springs SP1 and the inner springs SP2 in the radial direction.

In the embodiment, the plurality of outer springs SP1 and the plurality of vibration absorption springs SP3 are disposed on an identical circumference (see FIG. 3), and the distance between: the axis (rotational axis) of the starting device 1 and the damper device 10; and the axis of the outer springs SP1 and the distance between: the axis of the starting device 1 and the damper device 10; and the axis of the vibration absorption springs SP3 are equal to each other. Consequently, it is possible to suppress an increase in outside diameter of the damper device 10 better. In the embodiment, in addition, the outer springs SP1 and the vibration absorption springs SP3 are disposed such that the axes of the outer springs SP1 and the vibration absorption springs SP3 are included in an identical plane that is orthogonal to the axis of the starting device 1 and the damper device 10. Consequently, it is also possible to suppress an increase in axial length of the damper device 10. It should be noted, however, that it is not necessary that the distance between the axis of the damper device 10 and the axis of the outer springs SP1 and the distance between the axis of the damper device 10 and the axis of the vibration absorption springs SP3 need not completely coincide with each other and may be slightly different from each other because of a design tolerance or the like. Similarly, the axis of the outer springs SP1 and the axis of the vibration absorption springs SP3 may not be included in a completely identical plane, and may be slightly displaced from each other in the axial direction because of a design tolerance or the like.

Further, with the damper device 10 attached, both end portions of each of the vibration absorption springs SP3 abut against the corresponding second outer spring abutment portions 136 of the first intermediate plate member 13. In the embodiment, as illustrated in FIG. 3, the tab portions 136a of the second outer spring abutment portions 136 of the first intermediate plate member 13 and the spring abutment portions 21a of the mass body 21 are arranged side by side in the radial direction, and the tab portions 136a of the second outer spring abutment portions 136 abut against end portions of the corresponding vibration absorption springs SP3 on the radially inner side with respect to the spring abutment portions 21a of the mass body 21. Consequently, the vibration absorption springs SP3, that is, the dynamic damper 20, are coupled to the intermediate member 12 of the damper device 10.

In addition, the dynamic damper 20 (damper device 10) includes a third inter-element stopper 18 that restricts relative rotation between the mass body 21 and the first intermediate plate member 13 (intermediate member 12). The third inter-element stopper 18 is composed of: a stopper portion 137 that extends from the first intermediate plate member 13 toward the mass body 21; and an arc-shaped opening portion 21o formed in the mass body 21, for example. In the embodiment, a plurality of third inter-element stoppers 18 are provided by providing a plurality of stopper portions 137 to the first intermediate plate member 13 and providing a number of opening portions 21o in the mass body 21, the number being the same as that of the stopper portions 137. With the damper device 10 attached, the stopper portions 137 of the first intermediate plate member 13 are inserted into the corresponding opening portions 21*o* of the mass body 21 so as not to abut against inner wall surfaces on both sides that define the opening portions 21*o*. When the stopper portion 137 of the intermediate member 12 abuts against one of the inner wall surfaces of the opening portion 21*o* positioned on both sides along with relative rotation between the first intermediate plate member 13 (intermediate member 12) and the mass body 21, torsion of the vibration absorption springs SP3 and relative rotation between the mass body 21 and the first intermediate plate member 13 (intermediate member 12) are restricted.

In the damper device 10 which includes the dynamic damper 20 discussed above, the drive member 11 (second rotary element) which is a rotary element to which the dynamic damper 20 is not coupled is provided with additional abutment portions (additional coupling portions) 113*x* that abut against end portions of the vibration absorption springs SP3 before relative rotation between the drive member 11 and the driven member 15 is restricted by the first and second inter-element stoppers 16 and 17. That is, in the drive member 11 of the damper device 10, a plurality of (in the embodiment, two) spring abutment portions 113 (which include the tab portions 113*a*) that abut against end portions (on the left side in FIG. 3) of the outer springs SP1 on the downstream side (vehicle advancing direction side) in the direction (indicated by the arrow in FIG. 3; hereinafter referred to as "forward rotational direction") of rotation made when the drive member 11 is rotated by power from the engine with the damper device 10 attached are extended in the circumferential direction toward the downstream side (vehicle advancing direction side) in the forward rotational direction so as to have a circumferential length that is larger than the circumferential length required in terms of the strength or the like. In the embodiment, end portions, on the downstream side in the forward rotational direction, of the spring abutment portions 113 which are extended in the circumferential direction in this way are used as the additional abutment portions 113*x*.

With the damper device 10 attached, as illustrated in FIG. 3, the additional abutment portions 113*x* do not abut against end portions of the corresponding vibration absorption springs SP3 of the dynamic damper 20, and can abut against end portions of the corresponding vibration absorption springs SP3 when the drive member 11 is rotated in the forward rotational direction with respect to the intermediate member 12. In the embodiment, the circumferential length of the two spring abutment portions 113 (the angle about the axis of the damper device 10 which prescribes the circumferential length) is determined such that the additional abutment portions 113*x* abut against end portions of the corresponding vibration absorption springs SP3 (see FIG. 4) before torsion of the outer springs SP1 and relative rotation between the drive member 11 and the intermediate member 12 are restricted by the first inter-element stoppers 16 and at the same time as torsion of the inner springs SP2 and relative rotation between the intermediate member 12 and the driven member 15 are restricted by the second inter-element stoppers 17. That is, the angle of rotation of the drive member 11 with respect to the intermediate member 12 made before the additional abutment portions 113*x* abut against end portions of the corresponding vibration absorption springs SP3 is smaller than the angle of rotation of the drive member 11 with respect to the driven member 15 made before relative rotation is restricted by the first and second inter-element stoppers 16 and 17.

With the damper device 10 attached, in addition, as illustrated in FIG. 3, the tab portions 113*a* which are included in the additional abutment portions 113*x* are partially arranged side by side with (overlap with) the spring abutment portions 21*a* of the mass body 21 in the radial direction on the radially outer side of the spring abutment portions 21*a*. Consequently, with the damper device 10 attached, the tab portions 136*a* of the second outer spring abutment portions 136 of the first intermediate plate member 13, the spring abutment portions 21*a* of the mass body 21, and the tab portions 113*a* (end portions) which are included in the additional abutment portions 113*x* are arranged side by side in this order from the inner side toward the outer side. In addition, in the damper device 10, as discussed above, the tab portions 133*a* of the first outer spring abutment portions 133 of the first intermediate plate member 13 and the tab portions 113*a* of the spring abutment portions 113 of the drive member 11 are arranged side by side in the radial direction, and the tab portions 133*a* of the first outer spring abutment portions 133 abut against end portions of the corresponding outer springs SP1 on the radially inner side with respect to the tab portions 113*a* of the spring abutment portions 113. Consequently, the spring abutment portions 113, that is, the tab portions 113*a* of the additional abutment portions 113*x*, the spring abutment portions 21*a* of the mass body 21, and the tab portions 136*a* of the second outer spring abutment portions 136 of the first intermediate plate member 13 can be prevented from interfering with each other, and the tab portions 113*a* of the spring abutment portions 113 of the drive member 11 and the tab portions 133*a* of the first outer spring abutment portions 133 of the first intermediate plate member 13 can be prevented from interfering with each other. As a result, it is possible to secure the strokes of the outer springs SP1 and the vibration absorption springs SP3 which are arranged side by side in the circumferential direction well.

In the damper device 10, further, the first outer spring abutment portions 133 which abut against end portions of the outer springs SP1 and the second outer spring abutment portions 136 which abut against end portions of the vibration absorption springs SP3 are disposed in the first intermediate plate member 13 of the intermediate member 12 so as to be adjacent to each other in the circumferential direction. The first outer spring abutment portions 133 extend toward the radially outer side with respect to the second outer spring abutment portions 136 which abut against end portions of the vibration absorption springs SP3 on the radially inner side with respect to the spring abutment portions 21*a* of the mass body 21. That is, as illustrated in FIG. 3, the tab portions 133*a* of the first outer spring abutment portions 133 are positioned on the radially outer side with respect to the tab portions 136*a* of the second outer spring abutment portions 136. Consequently, generally the center of the end portions of the outer springs SP1 can be pushed by the first outer spring abutment portions 133 by causing the end portions of the outer springs SP1 and the first outer spring abutment portions 133 (tab portions 133*a*) to abut against each other such that the center of the end portions of the outer springs SP1 and the tab portions 133*a* of the first outer spring abutment portions 133 overlap with each other.

Next, operation of the starting device 1 configured as discussed above will be described.

Figure 5:
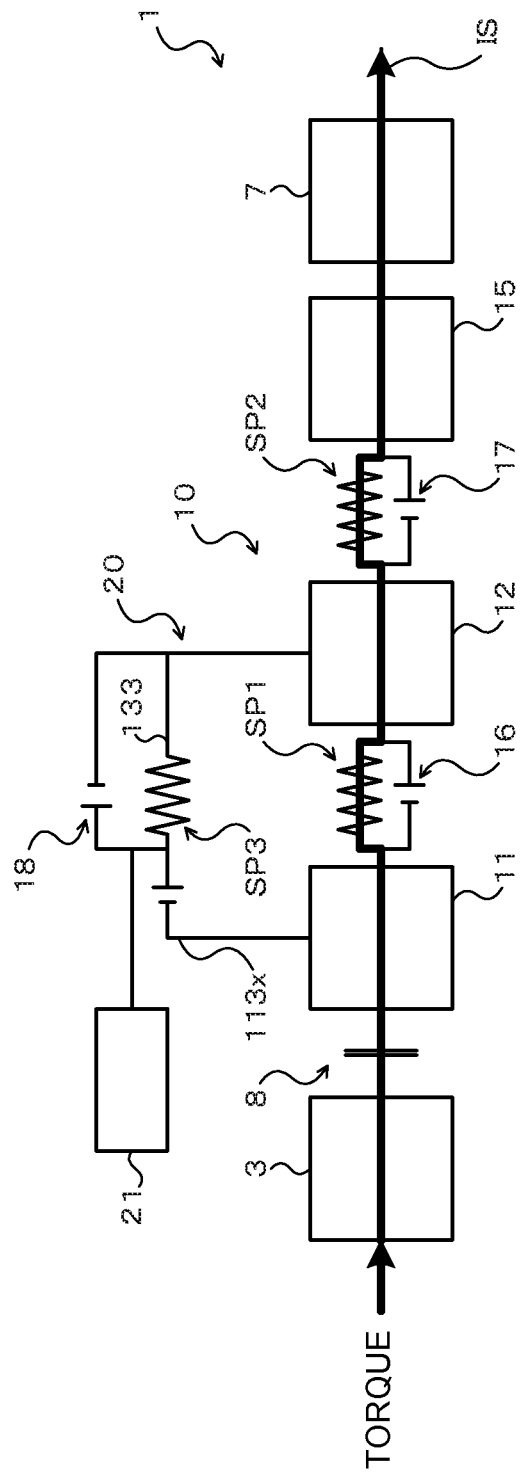
FIG. 5 is a schematic diagram illustrating operation of the starting device of FIG. 1.

When lock-up is released by the lock-up clutch 8 of the starting device 1, as seen from FIG. 1, torque (power) transferred from the engine which serves as a motor to the front cover 3 is transferred to the input shaft IS of the transmission via a path that includes the pump impeller 4, the turbine runner 5, and the damper hub 7. In contrast, when lock-up is established by the lock-up clutch 8 of the starting device 1, as seen from FIG. 5, torque from the engine is transferred to the input shaft IS of the speed change device via a path that includes the front cover 3, the lock-up clutch 8, the drive member 11, the outer springs SP1, the intermediate member 12, the inner springs SP2, the driven member 15, and the damper hub 7. In this event, fluctuations in torque input to the front cover 3 are mainly damped (absorbed) by the outer springs SP1 and the inner springs SP2 of the damper device 10 which act in series. Thus, in the starting device 1, when lock-up is established by the lock-up clutch 8, fluctuations in torque input to the front cover 3 can be damped (absorbed) well by the damper device 10.

Further, when the intermediate member 12 is rotated by torque from the engine along with rotation of the engine when lock-up is established, some (two) of the second outer spring abutment portions 136 of the first intermediate plate member 13 press first ends of the corresponding vibration absorption springs SP3, and second ends of the vibration absorption springs SP3 press one of the corresponding pair of spring abutment portions 21a of the mass body 21. As a result, the dynamic damper 20 which includes the mass body 21 and the plurality of vibration absorption springs SP3 is coupled to the intermediate member 12 of the damper device 10. Consequently, in the starting device 1, vibration from the engine can also be damped (absorbed) by the dynamic damper 20. More particularly, the overall level of the vibration can be lowered while providing the vibration with two separate peaks.

In the damper device 10, in addition, the drive member 11 and the intermediate member 12 rotate relative to each other and the intermediate member 12 and the driven member 15 rotate relative to each other in accordance with the magnitude of torque transferred from the engine to the front cover 3, that is, torque input to the drive member 11, when lock-up is established. In the embodiment, when torque input to the drive member 11 reaches a predetermined value (first value) T1 that is smaller than torque T2 (second value) that corresponds to a maximum torsional angle θ max of the damper device 10, torsion of the inner springs SP2 and relative rotation between the intermediate member 12 and the driven member 15 are restricted by the second inter-element stoppers 17, and, substantially at the same time, the additional abutment portions 113x of the drive member 11 abut against end portions of the corresponding vibration absorption springs SP3 (end portions on the upstream side in the forward rotational direction (on the side opposite to the vehicle advancing direction)) (see FIG. 4). The torsional angle of the outer springs SP1 corresponding to the angle of rotation of the drive member 11 with respect to the intermediate member 12 made before the additional abutment portions 113x abut against end portions of the vibration absorption springs SP3 from a state in which the damper device 10 is attached and torque input to the drive member 11 is zero is defined as "θd". The torsional angle of the inner springs SP2 corresponding to the angle of rotation of the intermediate member 12 with respect to the driven member 15 made before relative rotation is restricted by the second inter-element stoppers 17 from a state in which the damper device 10 is attached and torque input to the drive member 11 is zero is defined as "θ2". The combined spring constant of the plurality of outer springs SP1 which act in parallel between the drive member 11 and the intermediate member 12 is defined as "k1". The combined spring constant of the plurality of inner springs SP2 which act in parallel between the intermediate member 12 and the driven member 15 is defined as "k2". Then, a relationship $k1 \times \theta d = k2 \times \theta 2$, that is, $\theta d = \theta 2 \times k2/k1$, is established.

Figure 6:
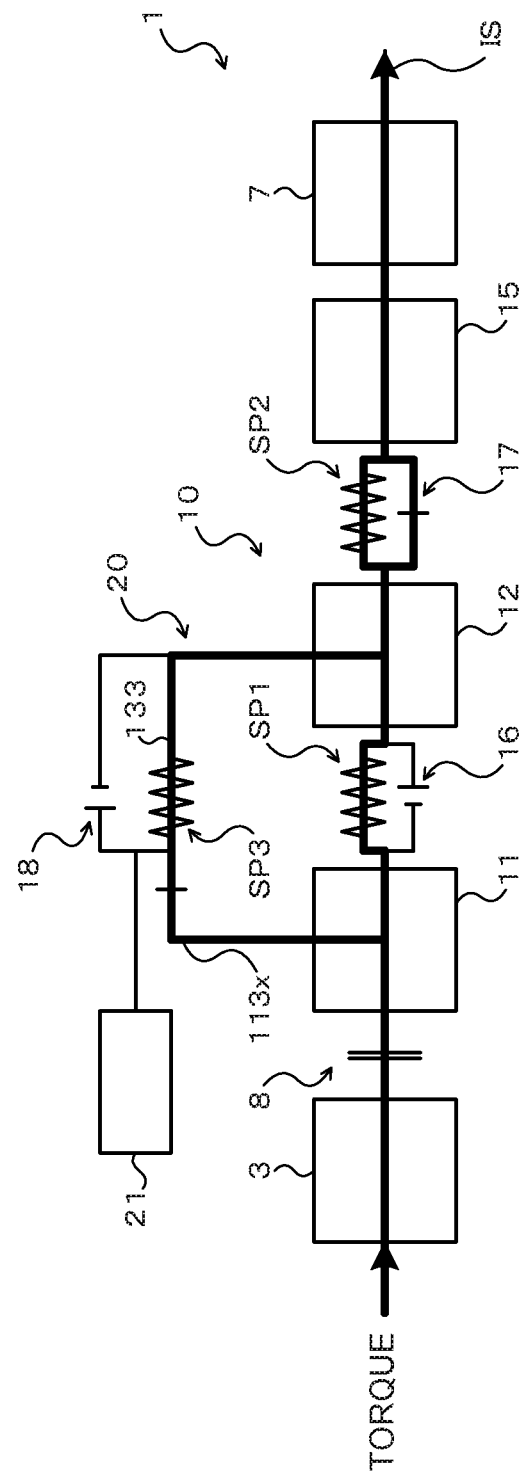
FIG. 6 is a schematic diagram illustrating operation of the starting device of FIG. 1.

In this way, when the additional abutment portions 113x of the drive member 11 abut against end portions of the corresponding vibration absorption springs SP3, the vibration absorption springs SP3 function as elastic bodies that act in parallel with the corresponding outer springs SP1 to transfer torque between the drive member 11 and the intermediate member 12. Consequently, after torsion of the inner springs SP2 and relative rotation between the intermediate member 12 and the driven member 15 are restricted by the second inter-element stoppers 17, as illustrated in FIG. 6, torque from the engine which serves as a motor is transferred to the input shaft IS of the speed change device via a path that includes the front cover 3, the lock-up clutch 8, the drive member 11, the outer springs SP1 and the vibration absorption springs SP3 which act in parallel, the intermediate member 12, the inner springs SP2, torsion of which has been restricted, and the second inter-element stoppers 17 (the stopper portions 135 and the opening portions 155) which are arranged in parallel with the inner springs SP2, the driven member 15, and the damper hub 7. In this event, fluctuations in torque input to the front cover 3 are damped (absorbed) by the outer springs SP1 and the vibration absorption springs SP3 of the damper device 10 which act in parallel.

Figure 7:
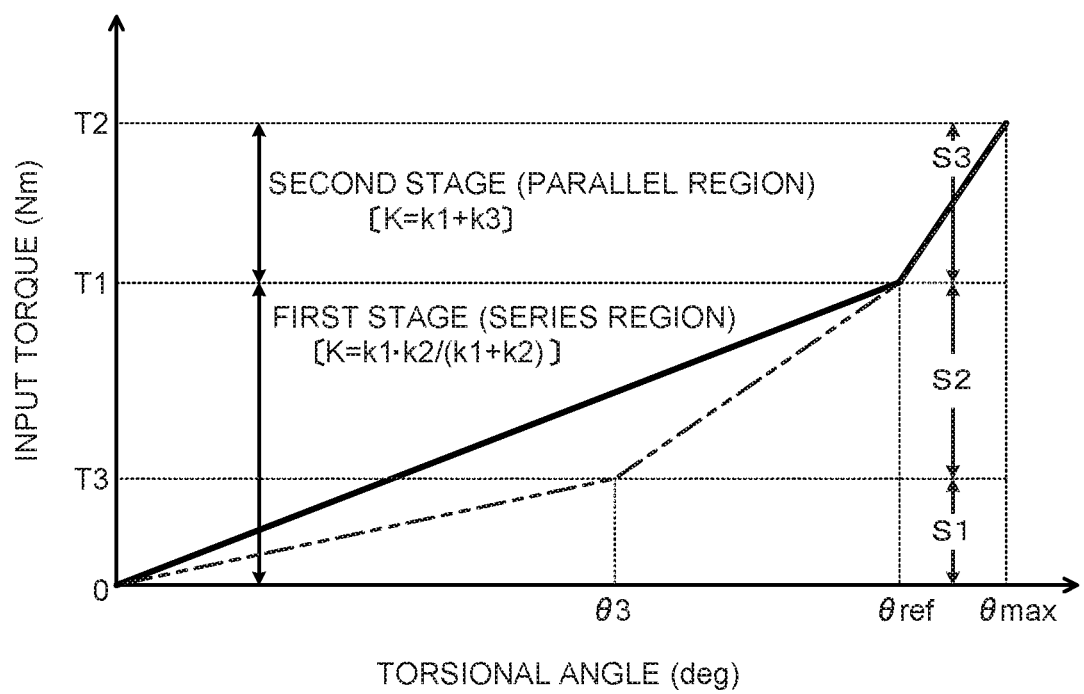
FIG. 7 is a chart illustrating the torsional characteristics of the damper device which is included in the starting device of FIG. 1.

As a result, the damper device 10 has the torsional characteristics illustrated in FIG. 7. That is, the combined spring constant K of the entire damper device 10 is $K = Kf = k1 \cdot k2/(k1+k2)$ during a period (first stage) from the start of transfer of torque from the engine to the front cover 3 until torque input to the drive member 11 reaches the predetermined value T1 so that the torsional angle of the damper device 10 (the total torsional angle of the outer springs SP1 and the inner springs SP2) is brought to a predetermined angle (threshold) θref and relative rotation between the drive member 11 and the driven member 15 is restricted by the second inter-element stoppers 17. Meanwhile, when the combined spring constant of the plurality of vibration absorption springs SP3 which act in parallel between the drive member 11 and the intermediate member 12 is defined as "k3", the combined spring constant K of the entire damper device 10 is $K = Ks = k1 + k3 > Kf$ during a period (second stage) after relative rotation between the drive member 11 and the driven member 15 is restricted by the second inter-element stoppers 17 until torque input to the drive member 11 reaches the value T2 so that the torsional angle of the damper device 10 (the total torsional angle of the outer springs SP1, the inner springs SP2, and the outer springs SP1 and the vibration absorption springs SP3 which act in parallel) is brought to the maximum torsional angle θ max determined in advance and relative rotation between the drive member 11 and the intermediate member 12 is restricted by the first inter-element stoppers 16.

As discussed above, in the damper device 10 which includes the dynamic damper 20 which is coupled to the intermediate member 12 which serves as a first rotary element, when the additional abutment portions 113x of the drive member 11 which serves as a second rotary element abut against end portions of the corresponding vibration absorption springs SP3 of the dynamic damper 20, the vibration absorption springs SP3 function as elastic bodies that transfer torque between the drive member 11 and the intermediate member 12. Consequently, in the damper device 10, the rigidity of the inner springs SP2, which do not transfer torque after the additional abutment portions 113x are coupled to the vibration absorption springs SP3, can be further lowered, and torque to be carried by (distributed to) the outer springs SP1 which act in parallel with the vibration absorption springs SP3 can be reduced to further lower the rigidity of the outer springs SP1. Thus, it is possible to further lower the rigidity of the damper device 10 which has the dynamic damper 20.

In addition, the damper device 10 includes the first inter-element stoppers 16 which restrict relative rotation between the drive member 11 and the intermediate member 12, and the additional abutment portions 113x of the drive member 11 abut against end portions of the corresponding vibration absorption springs SP3 before relative rotation between the drive member 11 and the intermediate member 12 is restricted by the first inter-element stoppers 16. Consequently, the outer springs SP1 which are provided between the drive member 11 and the intermediate member 12 and the vibration absorption springs SP3 can be caused to act in parallel. Thus, it is possible to allow input of higher torque to the drive member 11 after the additional abutment portions 113x abut against end portions of the corresponding vibration absorption springs SP3 while lowering the rigidity of the entire damper device 10.

In the damper device 10, further, the angle of rotation of the drive member 11 with respect to the intermediate member 12 made before the additional abutment portions 113x abut against end portions of the vibration absorption springs SP3 is determined to be smaller than the angle of rotation of the drive member 11 with respect to the driven member 15 made before relative rotation is restricted by the rotation restriction stoppers. Consequently, it is possible to cause the additional abutment portions 113x of the drive member 11 to abut against end portions of the vibration absorption springs SP3 before relative rotation between the drive member 11 and the driven member 15 is restricted by the first and second inter-element stoppers 16 and 17 which serve as the rotation restriction stoppers.

In addition, the additional abutment portions 113x abut against end portions of the corresponding vibration absorption springs SP3 when torque input to the drive member 11 becomes equal to or more than the predetermined value T1 which is smaller than the torque T2 which corresponds to the maximum torsional angle θ max of the damper device 10. In this way, by causing the vibration absorption springs SP3 to function as elastic bodies that transfer torque between the intermediate member 12 and the drive member 11 when torque input to the drive member 11 has been increased, it is possible to further lower the rigidity of at least the inner springs SP2.

Further, the damper device 10 includes, as the rotation restriction stoppers, the second inter-element stoppers 17 which restrict relative rotation between the intermediate member 12 and the driven member (third rotary element) 15 which is coupled to the intermediate member 12 via the inner springs SP2, and the additional abutment portions 113x abut against end portions of the corresponding vibration absorption springs SP3 at the same time as relative rotation between the intermediate member 12 and the driven member 15 is restricted by the second inter-element stoppers 17. Consequently, it is possible to provide the damper device 10 with two-stage torsional characteristics while lowering the rigidity of the entire damper device 10. It should be noted, however, that the additional abutment portions 113x and the second inter-element stoppers 17 may be configured such that relative rotation between the intermediate member 12 and the driven member 15 is restricted after the additional abutment portions 113x abut against end portions of the corresponding vibration absorption springs SP3. Consequently, it is possible to provide the damper device 10 with three-stage torsional characteristics by adjusting the rigidity (spring constant) of the outer springs SP1, the inner springs SP2, and the vibration absorption springs SP3.

In addition, in the damper device 10, as discussed above, the tab portions 113a of the additional abutment portions 113x, the spring abutment portions 21a of the mass body 21, and the tab portions 136a of the second outer spring abutment portions 136 of the first intermediate plate member 13 can be prevented from interfering with each other, and the tab portions 113a of the spring abutment portions 113 of the drive member 11 and the tab portions 133a of the first outer spring abutment portions 133 of the first intermediate plate member 13 can be prevented from interfering with each other. Thus, it is possible to secure the strokes of the outer springs SP1 and the vibration absorption springs SP3 which are arranged side by side in the circumferential direction better. Further, if the first outer spring abutment portions 133 which abut against end portions of the outer springs SP1 extend toward the radially outer side with respect to the second outer spring abutment portions 136 which abut against end portions of the vibration absorption springs SP3 as in the damper device 10, generally the center of the end portions of the outer springs SP1 can be pushed by the first outer spring abutment portions 133 by causing the end portions of the outer springs SP1 and the first outer spring abutment portions 133 (tab portions 133a) to abut against each other such that the center of the end portions of the outer springs SP1 and the first outer spring abutment portions 133 (tab portions 133a) overlap with each other. Consequently, it is possible to reduce a hysteresis, that is, a friction force that acts on the outer springs SP1 when the load is reduced, by more adequately expanding and contracting the outer springs SP1 which abut against the first outer spring abutment portions 133 of the intermediate member 12 along the axis. In the damper device 10, additionally, torque to be distributed to the outer springs SP1 which are provided between the drive member 11 (input element) and the intermediate member 12 (any rotary element) can be further lowered. Thus, it is possible to improve the degree of freedom in arrangement of the first outer spring abutment portions 133 (tab portions 133a) and the spring abutment portions 113 (tab portions 113a) which are arranged side by side in the radial direction by reducing the thickness of the first outer spring abutment portions 133 (tab portions 133a) of the intermediate member 12 which abut against the outer springs SP1 and the thickness of the spring abutment portions 113 (tab portions 113a) of the drive member 11.

In the damper device 10, the spring abutment portions 113 of the drive member 11 which abut against end portions of the outer springs SP1 and the additional abutment portions 113x are formed integrally with each other. However, the additional abutment portions 113x may be separated from the spring abutment portions 113, and the additional abutment portions 113x and the spring abutment portions 113 may be formed to be arranged side by side in the circumferential direction. In addition, depending on the rigidity (spring constant) of the outer springs SP1, the inner springs SP2, and the vibration absorption springs SP3, torsion of the inner springs SP2 and relative rotation between the intermediate member 12 and the driven member 15 may be restricted by the second inter-element stoppers 17 after torsion of the outer springs SP1 and relative rotation between the drive member 11 and the intermediate member 12 are restricted by the first inter-element stoppers 16 so that the inner springs SP2 and the vibration absorption springs SP3 which serve as elastic bodies that transfer torque may be caused to act in series after operation of the first inter-element stoppers 16 and before operation of the second inter-element stoppers 17. In the damper device 10, further, the first outer spring abutment portions 133 which abut against end portions of the outer springs SP1 extend toward the radially outer side with respect to the second outer spring abutment portions 136 which abut against end portions of the vibration absorption springs SP3. However, only the first outer spring abutment portions 133 that receive torque from the outer springs SP1 when the drive member 11 and the intermediate member 12 are rotated in the forward rotational direction may extend toward the radially outer side with respect to the second outer spring abutment portions 136.

In the damper device 10, when torque input to the drive member 11 reaches the predetermined value (first value) T1, torsion of the inner springs SP2 and relative rotation between the intermediate member 12 and the driven member 15 are restricted by the second inter-element stoppers 17, and, substantially at the same time, the additional abutment portions 113x of the drive member 11 abut against end portions of the corresponding vibration absorption springs SP3. However, the present disclosure is not limited thereto. That is, the second inter-element stoppers 17 which serve as the elastic body stoppers may be configured to restrict torsion of the inner springs SP2 and relative rotation between the intermediate member 12 and the driven member 15 at the time when torque input to the drive member 11 reaches torque T3 (third value) that is smaller than the predetermined value (first value) T1 and the torsional angle of the damper device 10 becomes an angle θ3 that is smaller than the predetermined angle θref. Consequently, the damper device 10 can be provided with three-stage torsional characteristics as indicated by the dash-double-dot line in FIG. 7.

In this case, the combined spring constant K of the entire damper device 10 is $K=Kf=k1 \cdot k2/(k1+k2)$ during a period (first stage S1) from the start of transfer of torque from the engine to the front cover 3 until torque input to the drive member 11 reaches the torque T3 so that the torsional angle of the damper device 10 is brought to the angle θ3 and relative rotation between the intermediate member 12 and the driven member 15 is restricted by the second inter-element stoppers 17. Meanwhile, the combined spring constant K of the entire damper device 10 is $Ks=k1$ during a period (second stage S2) after relative rotation between the intermediate member 12 and the driven member 15 is restricted by the second inter-element stoppers 17 until torque input to the drive member 11 reaches the predetermined value T1 so that the additional abutment portions 113x of the drive member 11 abut against end portions of the corresponding vibration absorption springs SP3. Further, the combined spring constant K of the entire damper device 10 is $K=Kt=k1+k3>Kf$, Ks during a period (third stage S3) after the additional abutment portions 113x of the drive member 11 abut against end portions of the corresponding vibration absorption springs SP3 until relative rotation between the drive member 11 and the intermediate member 12 is restricted by the first inter-element stoppers 16.

Consequently, it is possible to further lower the rigidity of the damper device 10 by adjusting various specifications such as the spring constant of the outer springs SP1, the inner springs SP2, and the vibration absorption springs SP3. By providing the damper device 10 with three-stage characteristics, in addition, the difference in spring constant between the first and second stages S1 and S2 and the difference in spring constant between the second and third stages S2 and S3 can be reduced. Consequently, non-linearity can be reduced, and torque fluctuations (vibration) can be damped well compared to the damper device with two-stage torsional characteristics such as those indicated by the solid line in FIG. 7 even if the input torque is fluctuated (vibrated) around the torque T1 or T3 which serves as a threshold.

Figure 8:
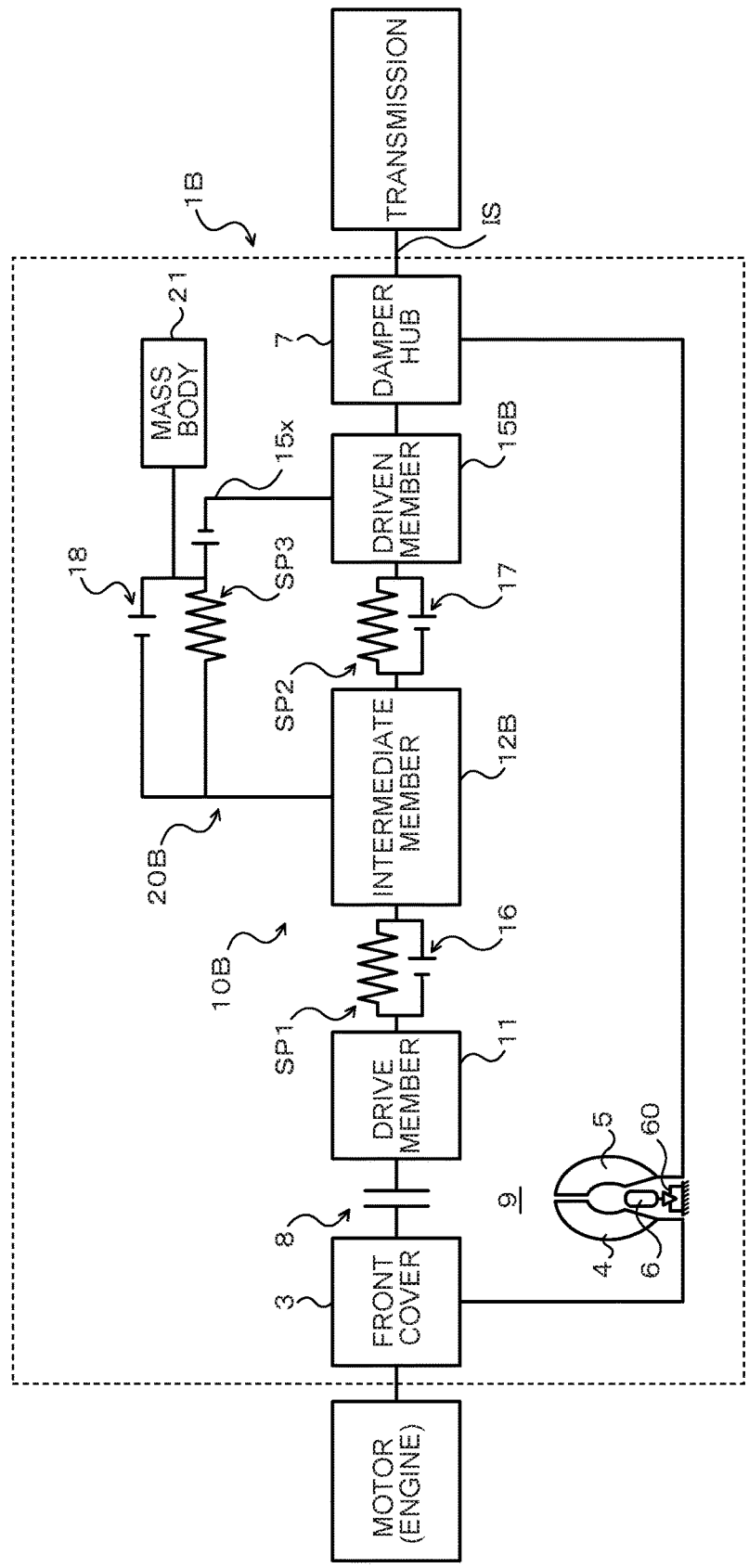
FIG. 8 is a schematic configuration diagram illustrating a starting device that includes a damper device according to another embodiment.

FIG. 8 is a schematic configuration diagram illustrating a starting device 1B that includes a damper device 10B according to another embodiment of the present disclosure. Constituent elements of the starting device 1B that are identical to the elements of the starting device 1 discussed above are given the same reference numerals to omit redundant descriptions.

In the damper device 10B illustrated in FIG. 8, a dynamic damper 20B is coupled to an intermediate member 12B (first rotary element), and a driven member 15B (second rotary element) is provided with additional abutment portions 15x that abut against the vibration absorption springs SP3. In the damper device 10B, in addition, the first and second inter-element stoppers 16 and 17 are configured such that torsion of the outer springs SP1 and relative rotation between the drive member 11 and the intermediate member 12B are restricted by the first inter-element stoppers 16 before torsion of the inner springs SP2 and relative rotation between the intermediate member 12B and the driven member 15B are restricted by the second inter-element stoppers 17 along with an increase in input torque.

Further, the additional abutment portions 15x of the driven member 15B are configured to abut against end portions of the corresponding vibration absorption springs SP3 before torsion of the inner springs SP2 and relative rotation between the intermediate member 12B and the driven member 15B are restricted by the second inter-element stoppers 17 and at the same time as torsion of the outer springs SP1 and relative rotation between the drive member 11 and the intermediate member 12B are restricted by the first inter-element stoppers 16. Thus, when the torsional angle of the inner springs SP2 corresponding to the angle of rotation of the intermediate member 12B with respect to the driven member 15B made before the additional abutment portions 15x abut against end portions of the vibration absorption springs SP3 is defined as "θd" and the torsional angle of the outer springs SP1 corresponding to the angle of rotation of the drive member 11 with respect to the intermediate member 12B made before relative rotation is restricted by the first inter-element stoppers 16 is defined as "θ1", a relationship $k1 \times \theta1 = k2 \times \theta d$, that is, $\theta d = \theta 1 \times k1/k2$, is established.

Consequently, in the damper device 10B which includes the dynamic damper 20B which is coupled to the intermediate member 12B which serves as a first rotary element, when the additional abutment portions 15x of the driven member 15B which serves as a second rotary element abut against end portions of the corresponding vibration absorption springs SP3 of the dynamic damper 20B, the vibration absorption springs SP3 function as elastic bodies that transfer torque between the intermediate member 12B and the driven member 15B. As a result, in the damper device 10B, the rigidity of the outer springs SP1, which do not transfer torque after the additional abutment portions 15x are coupled to the vibration absorption springs SP3, can be further lowered, and torque to be carried by (distributed to) the inner springs SP2 which act in parallel with the vibration absorption springs SP3 can be reduced to further lower the rigidity of the inner springs SP2. Thus, it is possible to further lower the rigidity of the damper device 10B which has the dynamic damper 20B.

In addition, the additional abutment portions 15x of the driven member 15B abut against end portions of the vibration absorption springs SP3 before relative rotation between the intermediate member 12B and the driven member 15B is restricted by the second inter-element stoppers 17. Consequently, the inner springs SP2 which are provided between the intermediate member 12B and the driven member 15B and the vibration absorption springs SP3 can be caused to act in parallel. Thus, it is possible to allow input of higher torque to the drive member 11 after the additional abutment portions 15x abut against end portions of the corresponding vibration absorption springs SP3 while lowering the rigidity of the entire damper device 10B.

In the damper device 10B, further, the angle of rotation of the intermediate member 12B with respect to the driven member 15B made before the additional abutment portions 15x abut against end portions of the vibration absorption springs SP3 is determined to be smaller than the angle of rotation of the drive member 11 with respect to the driven member 15B made before relative rotation is restricted by the first and second inter-element stoppers 16 and 17. Consequently, it is possible to cause the additional abutment portions 15x of the driven member 15B to abut against end portions of the vibration absorption springs SP3 before relative rotation between the drive member 11 and the driven member 15B is restricted by the first and second inter-element stoppers 16 and 17 which serve as the rotation restriction stoppers.

In addition, the additional abutment portions 15x of the driven member 15B abut against end portions of the corresponding vibration absorption springs SP3 when torque input to the drive member 11 becomes equal to or more than the predetermined value (first value) which is smaller than the torque which corresponds to the maximum torsional angle of the damper device 10B. In this way, by causing the vibration absorption springs SP3 to function as elastic bodies that transfer torque between the intermediate member 12B and the driven member 15B when torque input to the drive member 11 has been increased, it is possible to further lower the rigidity of at least one of the outer springs SP1 and the inner springs SP2.

Further, the additional abutment portions 15x of the driven member 15B abut against end portions of the corresponding vibration absorption springs SP3 at the same time as relative rotation between the drive member 11 and the intermediate member 12B is restricted by the first inter-element stoppers 16. Consequently, it is possible to provide the damper device 10B with two-stage torsional characteristics while lowering the rigidity of the entire damper device 10B. It should be noted, however, that the additional abutment portions 15x and the first inter-element stoppers 16 may be configured such that relative rotation between the drive member 11 and the intermediate member 12B is restricted after the additional abutment portions 15x abut against end portions of the corresponding vibration absorption springs SP3. Consequently, it is possible to provide the damper device 10B with three-stage torsional characteristics by adjusting the rigidity (spring constant) of the outer springs SP1, the inner springs SP2, and the vibration absorption springs SP3.

In the damper device 10B, in addition, the inner springs SP2 and the vibration absorption springs SP3 may be disposed side by side in the circumferential direction. Consequently, it is possible to easily couple the vibration absorption springs SP3 and the turbine runner 5 which serves as a mass body to each other using a coupling member, and to reduce a space for arrangement of the coupling member. Thus, such a configuration is advantageous for a case where a centrifugal-pendulum vibration absorbing device is coupled to the damper device 10B in addition to the dynamic damper 20B. In the damper device 10B, further, the vibration absorption springs SP3 may be configured to act in series with the outer springs SP1, or both the outer springs SP1 and the inner springs SP2, when the vibration absorption springs SP3 function as elastic bodies that transfer torque.

Figure 9:
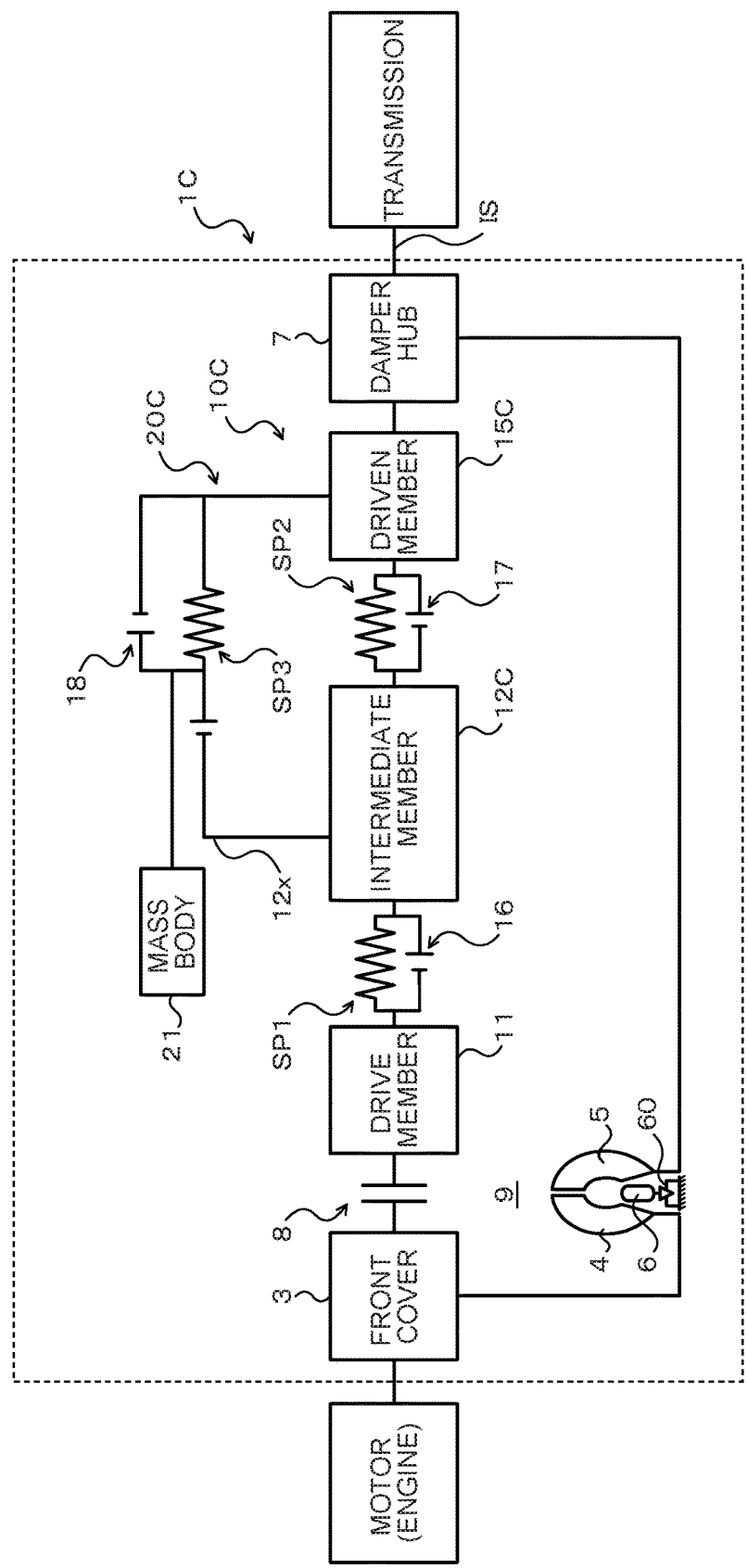
FIG. 9 is a schematic configuration diagram illustrating a starting device that includes a damper device according to still another embodiment.

FIG. 9 is a schematic configuration diagram illustrating a starting device IC that includes a damper device 10C according to another embodiment of the present disclosure. Constituent elements of the starting device IC that are identical to the elements of the starting device 1 etc. discussed above are given the same reference numerals to omit redundant descriptions.

In the damper device 10C illustrated in FIG. 9, a dynamic damper 20C is coupled to a driven member 15C (first rotary element), and an intermediate member 12C (second rotary element) is provided with additional abutment portions 12x that abut against the vibration absorption springs SP3. In the damper device 10C, in addition, the first and second inter-element stoppers 16 and 17 are configured such that torsion of the outer springs SP1 and relative rotation between the drive member 11 and the intermediate member 12C are restricted by the first inter-element stoppers 16 before torsion of the inner springs SP2 and relative rotation between the intermediate member 12C and the driven member 15C are restricted by the second inter-element stoppers 17 along with an increase in input torque.

Further, the additional abutment portions 12x of the intermediate member 12C are configured to abut against end portions of the corresponding vibration absorption springs SP3 before torsion of the inner springs SP2 and relative rotation between the intermediate member 12C and the driven member 15C are restricted by the second inter-element stoppers 17 and at the same time as torsion of the outer springs SP1 and relative rotation between the drive member 11 and the intermediate member 12C are restricted by the first inter-element stoppers 16. Thus, when the torsional angle of the inner springs SP2 corresponding to the angle of rotation of the intermediate member 12C with respect to the driven member 15C made before the additional abutment portions 12x abut against end portions of the vibration absorption springs SP3 is defined as "θd" and the torsional angle of the outer springs SP1 corresponding to the angle of rotation of the drive member 11 with respect to the intermediate member 12C made before relative rotation is restricted by the first inter-element stoppers 16 is defined as "θ1", a relationship k1×θd=k2×θd, that is, θd=θ1×k1/k2, is established.

Consequently, in the damper device 10C which includes the dynamic damper 20C which is coupled to the driven member 15C which serves as a first rotary element, when the additional abutment portions 12x of the intermediate member 12C which serves as a second rotary element abut against end portions of the corresponding vibration absorption springs SP3 of the dynamic damper 20C, the vibration absorption springs SP3 function as elastic bodies that transfer torque between the intermediate member 12C and the driven member 15C. As a result, in the damper device 10C, the rigidity of the outer springs SP1, which do not transfer torque after the additional abutment portions 12x are coupled to the vibration absorption springs SP3, can be further lowered, and torque to be carried by (distributed to) the inner springs SP2 which act in parallel with the vibration absorption springs SP3 can be reduced to further lower the rigidity of the inner springs SP2. Thus, it is possible to further lower the rigidity of the damper device 10C which has the dynamic damper 20C.

In addition, the additional abutment portions 12x of the intermediate member 12C abut against end portions of the vibration absorption springs SP3 before relative rotation between the intermediate member 12C and the driven member 15C is restricted by the second inter-element stoppers 17. Consequently, the inner springs SP2 which are provided between the intermediate member 12C and the driven member 15C and the vibration absorption springs SP3 can be caused to act in parallel. Thus, it is possible to allow input of higher torque to the drive member 11 after the additional abutment portions 12x abut against end portions of the corresponding vibration absorption springs SP3 while lowering the rigidity of the entire damper device 10C.

In the damper device 10C, further, the angle of rotation of the intermediate member 12C with respect to the driven member 15C made before the additional abutment portions 12x abut against end portions of the vibration absorption springs SP3 is determined to be smaller than the angle of rotation of the drive member 11 with respect to the driven member 15C made before relative rotation is restricted by the first and second inter-element stoppers 16 and 17. Consequently, it is possible to cause the additional abutment portions 12x of the intermediate member 12C to abut against end portions of the vibration absorption springs SP3 before relative rotation between the drive member 11 and the driven member 15C is restricted by the first and second inter-element stoppers 16 and 17 which serve as the rotation restriction stoppers.

In addition, the additional abutment portions 12x of the intermediate member 12C abut against end portions of the corresponding vibration absorption springs SP3 when torque input to the drive member 11 becomes equal to or more than the predetermined value (first value) which is smaller than the torque which corresponds to the maximum torsional angle of the damper device 10C. In this way, by causing the vibration absorption springs SP3 to function as elastic bodies that transfer torque between the intermediate member 12C and the driven member 15C when torque input to the drive member 11 has been increased, it is possible to further lower the rigidity of at least one of the outer springs SP1 and the inner springs SP2.

Further, the additional abutment portions 12x of the intermediate member 12C abut against end portions of the corresponding vibration absorption springs SP3 at the same time as relative rotation between the drive member 11 and the intermediate member 12C is restricted by the first inter-element stoppers 16. Consequently, it is possible to provide the damper device 10C with two-stage torsional characteristics while lowering the rigidity of the entire damper device 10C. It should be noted, however, that the additional abutment portions 12x and the first inter-element stoppers 16 may be configured such that relative rotation between the drive member 11 and the intermediate member 12C is restricted after the additional abutment portions 12x abut against end portions of the corresponding vibration absorption springs SP3. Consequently, it is possible to provide the damper device 10C with three-stage torsional characteristics by adjusting the rigidity (spring constant) of the outer springs SP1, the inner springs SP2, and the vibration absorption springs SP3.

Also in the damper device 10C, in addition, the inner springs SP2 and the vibration absorption springs SP3 may be disposed side by side in the circumferential direction. Consequently, it is possible to easily couple the vibration absorption springs SP3 and the turbine runner 5 which serves as a mass body to each other using a coupling member, and to reduce a space for arrangement of the coupling member. Thus, such a configuration is advantageous for a case where a centrifugal-pendulum vibration absorbing device is coupled to the damper device 10C in addition to the dynamic damper 20C. In the damper device 10C, further, the vibration absorption springs SP3 may be configured to act in series with the outer springs SP1, or both the outer springs SP1 and the inner springs SP2, when the vibration absorption springs SP3 function as elastic bodies that transfer torque.

Figure 10:
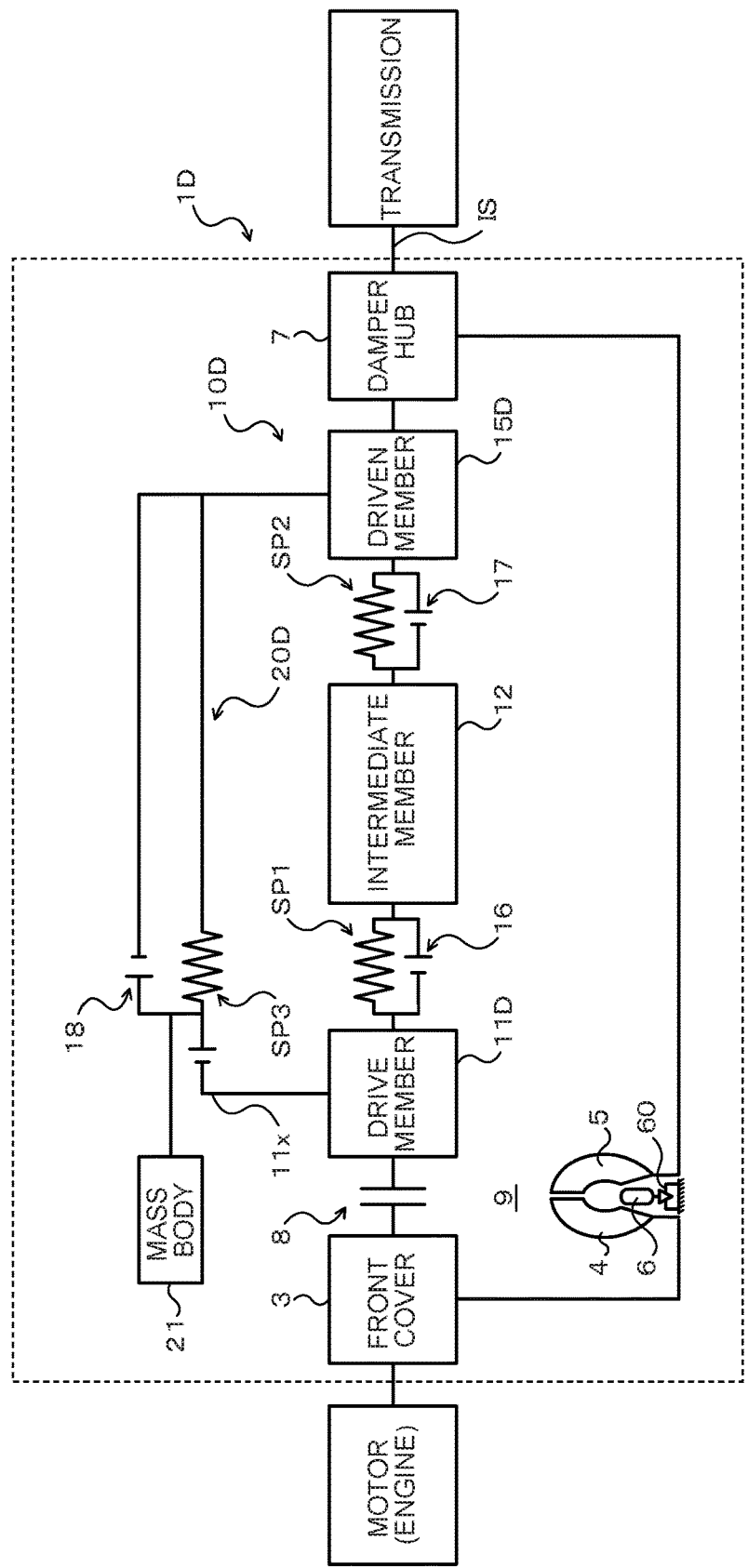
FIG. 10 is a schematic configuration diagram illustrating a starting device that includes a damper device according to another embodiment.

FIG. 10 is a schematic configuration diagram illustrating a starting device 1D that includes a damper device 10D according to still another embodiment of the present disclosure. Constituent elements of the starting device 1D that are identical to the elements of the starting device 1 etc. discussed above are given the same reference numerals to omit redundant descriptions.

In the damper device 10D illustrated in FIG. 10, a dynamic damper 20D is coupled to a driven member 15D (first rotary element), and a drive member 11D (second rotary element) is provided with additional abutment portions 11x that abut against the vibration absorption springs SP3. In the damper device 10D, in addition, the first and second inter-element stoppers 16 and 17 are configured such that one of the first and second inter-element stoppers 16 and 17 restrict relative rotation between two corresponding rotary elements earlier than the other. Further, the additional abutment portions 11x of the drive member 11D are configured to abut against end portions of the corresponding vibration absorption springs SP3 before relative rotation between two rotary elements is restricted by the other of the first and second inter-element stoppers 16 and 17 and at the same time as relative rotation between two rotary elements is restricted by the one of the first and inter-element stoppers 16 and 17.

In the case where the first inter-element stoppers 16 restrict relative rotation between two rotary elements earlier, the torsional angle corresponding to the angle of rotation of the drive member 11D with respect to the driven member 15D made before the additional abutment portions 11x abut against end portions of the vibration absorption springs SP3 is defined as "θd", and the torsional angle of the outer springs SP1 corresponding to the angle of rotation of the drive member 11D with respect to the intermediate member 12 made before relative rotation is restricted by the first inter-element stoppers 16 is defined as "θ1". Then, a relationship θd=θ1+θ1×k1/k2, that is. θd=θ1×(k1+k2)/k2, is established. In the case where the second inter-element stoppers 17 restrict relative rotation between two rotary elements earlier, meanwhile, the torsional angle corresponding to the angle of rotation of the drive member 11D with respect to the driven member 15D made before the additional abutment portions 11x abut against end portions of the vibration absorption springs SP3 is defined as "θd", and the torsional angle of the inner springs SP2 corresponding to the angle of rotation of the intermediate member 12 with respect to the driven member 15D made before relative rotation is restricted by the second inter-element stoppers 17 is defined as "θ2". Then, a relationship θd=θ2+θ2×k2/k1, that is, θd=θ2×(k1+k2)/k1, is established.

Consequently, in the damper device 10D which includes the dynamic damper 20D which is coupled to the driven member 15D which serves as a first rotary element, when the additional abutment portions 11x of the drive member 11D which serves as a second rotary element abut against end portions of the corresponding vibration absorption springs SP3 of the dynamic damper 20D, the vibration absorption springs SP3 function as elastic bodies that transfer torque between the drive member 11D and the driven member 15D. As a result, in the damper device 10D, the rigidity of one of the outer springs SP1 and the inner springs SP2, which do not transfer torque after the additional abutment portions 11x are coupled to the vibration absorption springs SP3, can be further lowered, and torque to be carried by (distributed to) the other of the outer springs SP1 and the inner springs SP2 which act in parallel with the vibration absorption springs SP3 can be reduced to further lower the rigidity of the other of the outer springs SP1 and the inner springs SP2. Thus, it is possible to further lower the rigidity of the damper device 10D which has the dynamic damper 20D.

In addition, the additional abutment portions 11x of the drive member 11D abut against end portions of the vibration absorption springs SP3 before relative rotation between the drive member 11D and the intermediate member 12 is restricted by the first inter-element stoppers 16 or before relative rotation between the intermediate member 12 and the driven member 15D is restricted by the second inter-element stoppers 17. Consequently, the vibration absorption springs SP3 can be caused to act in parallel with one of the outer springs SP1 and the inner springs SP2. Thus, it is possible to allow input of higher torque to the drive member 11D after the additional abutment portions 11x abut against end portions of the corresponding vibration absorption springs SP3 while lowering the rigidity of the entire damper device 10D.

In the damper device 10D, further, the angle of rotation of the drive member 11D with respect to the driven member 15D made before the additional abutment portions 11x abut against end portions of the vibration absorption springs SP3 is determined to be smaller than the angle of rotation of the drive member 11D with respect to the driven member 15D made before relative rotation is restricted by the first and second inter-element stoppers 16 and 17. Consequently, it is possible to cause the additional abutment portions 11x of the drive member 11D to abut against end portions of the vibration absorption springs SP3 before relative rotation between the drive member 11D and the driven member 15D is restricted by the first and second inter-element stoppers 16 and 17 which serve as the rotation restriction stoppers.

In addition, the additional abutment portions 11x of the drive member 11D abut against end portions of the corresponding vibration absorption springs SP3 when torque input to the drive member 11D becomes equal to or more than the predetermined value (first value) which is smaller than the torque which corresponds to the maximum torsional angle of the damper device 10D. In this way, by causing the vibration absorption springs SP3 to function as elastic bodies that transfer torque between the drive member 11D and the driven member 15D when torque input to the drive member 11D has been increased, it is possible to further lower the rigidity of at least one of the outer springs SP1 and the inner springs SP2.

Further, the additional abutment portions 11x of the drive member 11D abut against end portions of the corresponding vibration absorption springs SP3 at the same time as relative rotation between two rotary elements is restricted by one of the first and second inter-element stoppers 16 and 17 that operate earlier. Consequently, it is possible to provide the damper device 10D with two-stage torsional characteristics while lowering the rigidity of the entire damper device 10D. It should be noted, however, that the additional abutment portions 11x and the first and second inter-element stoppers 16 and 17 may be configured such that relative rotation between two rotary elements is restricted by one of the first and second inter-element stoppers 16 and 17 that operate earlier after the additional abutment portions 11x abut against end portions of the corresponding vibration absorption springs SP3. Consequently, it is possible to provide the damper device 10D with three-stage torsional characteristics by adjusting the rigidity (spring constant) of the outer springs SP1, the inner springs SP2, and the vibration absorption springs SP3. In the damper device 10D, in addition, the vibration absorption springs SP3 may be disposed side by side in the circumferential direction with one of the outer springs SP1 and the inner springs SP2.

Figure 11:
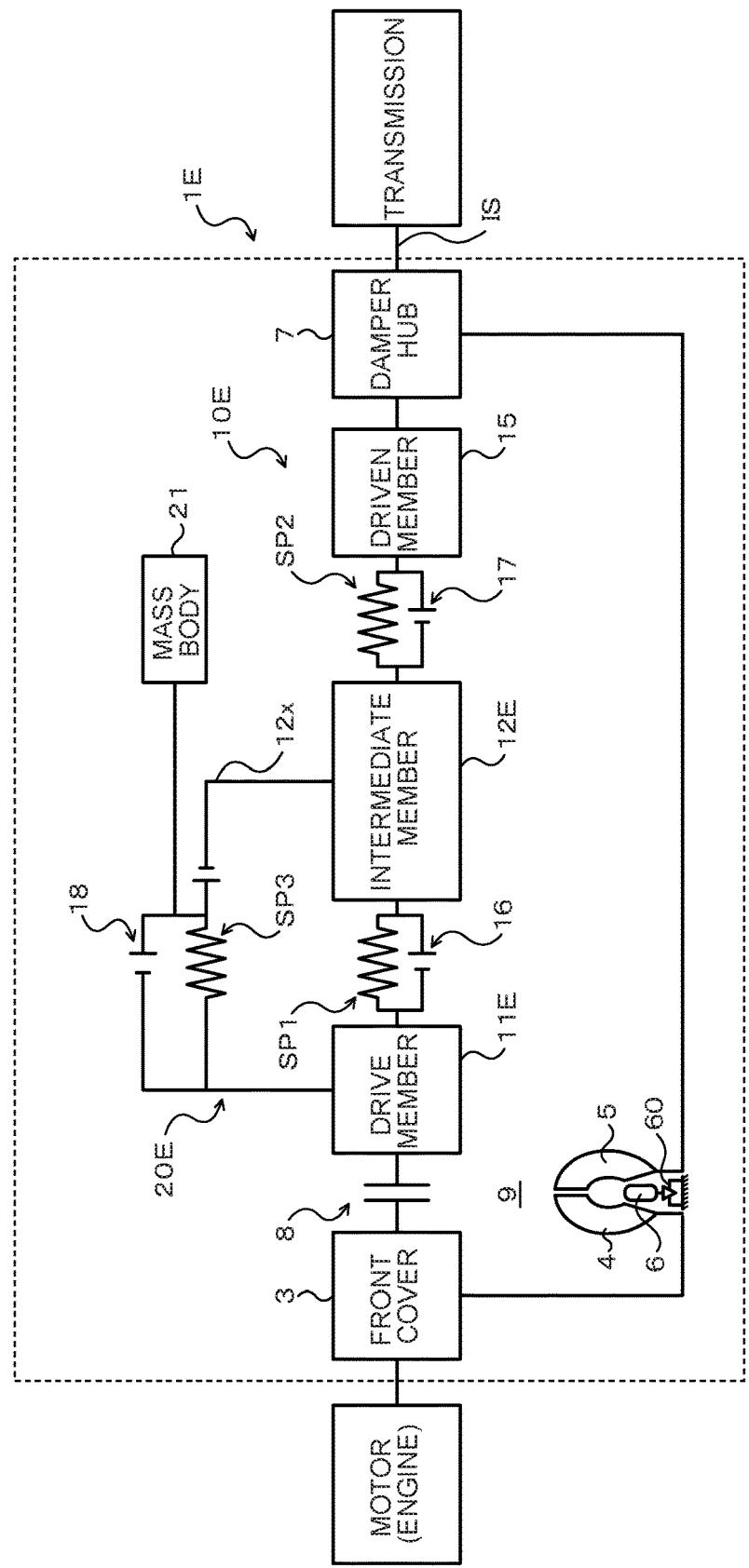
FIG. 11 is a schematic configuration diagram illustrating a starting device that includes a damper device according to still another embodiment.

FIG. 11 is a schematic configuration diagram illustrating a starting device 1E that includes a damper device 10E according to still another embodiment of the present disclosure. Constituent elements of the starting device 1E that are identical to the elements of the starting device 1 etc. discussed above are given the same reference numerals to omit redundant descriptions.

In the damper device 10E illustrated in FIG. 11, a dynamic damper 20E is coupled to a drive member 11E (first rotary element), and an intermediate member 12E (second rotary element) is provided with additional abutment portions 12x that abut against the vibration absorption springs SP3. In the damper device 10E, in addition, the first and second inter-element stoppers 16 and 17 are configured such that torsion of the inner springs SP2 and relative rotation between the intermediate member 12E and the driven member 15 are restricted by the second inter-element stoppers 17 before torsion of the outer springs SP1 and relative rotation between the drive member 11E and the intermediate member 12E are restricted by the first inter-element stoppers 16 along with an increase in input torque.

Further, the additional abutment portions 12x of the intermediate member 12E are configured to abut against end portions of the corresponding vibration absorption springs SP3 before torsion of the outer springs SP1 and relative rotation between the drive member 11E and the intermediate member 12E are restricted by the first inter-element stoppers 16 and at the same time as torsion of the inner springs SP2 and relative rotation between the intermediate member 12E and the driven member 15 are restricted by the second inter-element stoppers 17. Thus, when the torsional angle of the outer springs SP1 corresponding to the angle of rotation of the drive member 11E with respect to the intermediate member 12E made before the additional abutment portions 12x abut against end portions of the vibration absorption springs SP3 is defined as "θd" and the torsional angle of the inner springs SP2 corresponding to the angle of rotation of the intermediate member 12E with respect to the driven member 15 made before relative rotation is restricted by the second inter-element stoppers 17 is defined as "θ2", a relationship k1×θd=k2×θ2, that is, θd=θ2×k2/k1, is established.

Consequently, in the damper device 10E which includes the dynamic damper 20E which is coupled to the drive member 11E which serves as a first rotary element, when the additional abutment portions 12x of the intermediate member 12E which serves as a second rotary element abut against end portions of the corresponding vibration absorption springs SP3 of the dynamic damper 20E, the vibration absorption springs SP3 function as elastic bodies that transfer torque between the drive member 11E and the intermediate member 12E. As a result, in the damper device 10E, the rigidity of the inner springs SP2, which do not transfer torque after the additional abutment portions 12x are coupled to the vibration absorption springs SP3, can be further lowered, and torque to be carried by (distributed to) the outer springs SP1 which act in parallel with the vibration absorption springs SP3 can be reduced to further lower the rigidity of the outer springs SP1. Thus, it is possible to further lower the rigidity of the damper device 10E which has the dynamic damper 20E.

In addition, the additional abutment portions 12x of the intermediate member 12E abut against end portions of the vibration absorption springs SP3 before relative rotation between the drive member 11E and the intermediate member 12E is restricted by the first inter-element stoppers 16. Consequently, the inner springs SP2 which are provided between the drive member 11E and the intermediate member 12E and the vibration absorption springs SP3 can be caused to act in parallel. Thus, it is possible to allow input of higher torque to the drive member 11E after the additional abutment portions 12x abut against end portions of the corresponding vibration absorption springs SP3 while lowering the rigidity of the entire damper device 10E.

In the damper device 10E, further, the angle of rotation of the drive member 11E with respect to the intermediate member 12E made before the additional abutment portions 12x abut against end portions of the vibration absorption springs SP3 is determined to be smaller than the angle of rotation of the drive member 11E with respect to the driven member 15 made before relative rotation is restricted by the first and second inter-element stoppers 16 and 17. Consequently, it is possible to cause the additional abutment portions 12x of the intermediate member 12E to abut against end portions of the vibration absorption springs SP3 before relative rotation between the drive member 11E and the driven member 15 is restricted by the first and second inter-element stoppers 16 and 17 which serve as the rotation restriction stoppers.

In addition, the additional abutment portions 12x of the intermediate member 12E abut against end portions of the corresponding vibration absorption springs SP3 when torque input to the drive member 11E becomes equal to or more than the predetermined value (first value) which is smaller than the torque which corresponds to the maximum torsional angle of the damper device 10E. In this way, by causing the vibration absorption springs SP3 to function as elastic bodies that transfer torque between the drive member 11E and the intermediate member 12E when torque input to the drive member 11E has been increased, it is possible to further lower the rigidity of at least one of the outer springs SP1 and the inner springs SP2.

Further, the additional abutment portions 12x of the intermediate member 12E abut against end portions of the corresponding vibration absorption springs SP3 at the same time as relative rotation between the intermediate member 12E and the driven member 15 is restricted by the second inter-element stoppers 17. Consequently, it is possible to provide the damper device 10E with two-stage torsional characteristics while lowering the rigidity of the entire damper device 10E. It should be noted, however, that the additional abutment portions 12x and the second inter-element stoppers 17 may be configured such that relative rotation between the intermediate member 12E and the driven member 15 is restricted after the additional abutment portions 12x abut against end portions of the corresponding vibration absorption springs SP3. Consequently, it is possible to provide the damper device 10E with three-stage torsional characteristics by adjusting the rigidity (spring constant) of the outer springs SP1, the inner springs SP2, and the vibration absorption springs SP3. Also in the damper device 10E, in addition, the outer springs SP1 and the vibration absorption springs SP3 may be disposed side by side in the circumferential direction. In the damper device 10E, further, the vibration absorption springs SP3 may be configured to act in series with the outer springs SP1, or both the outer springs SP1 and the inner springs SP2, when the vibration absorption springs SP3 function as elastic bodies that transfer torque.

Figure 12:
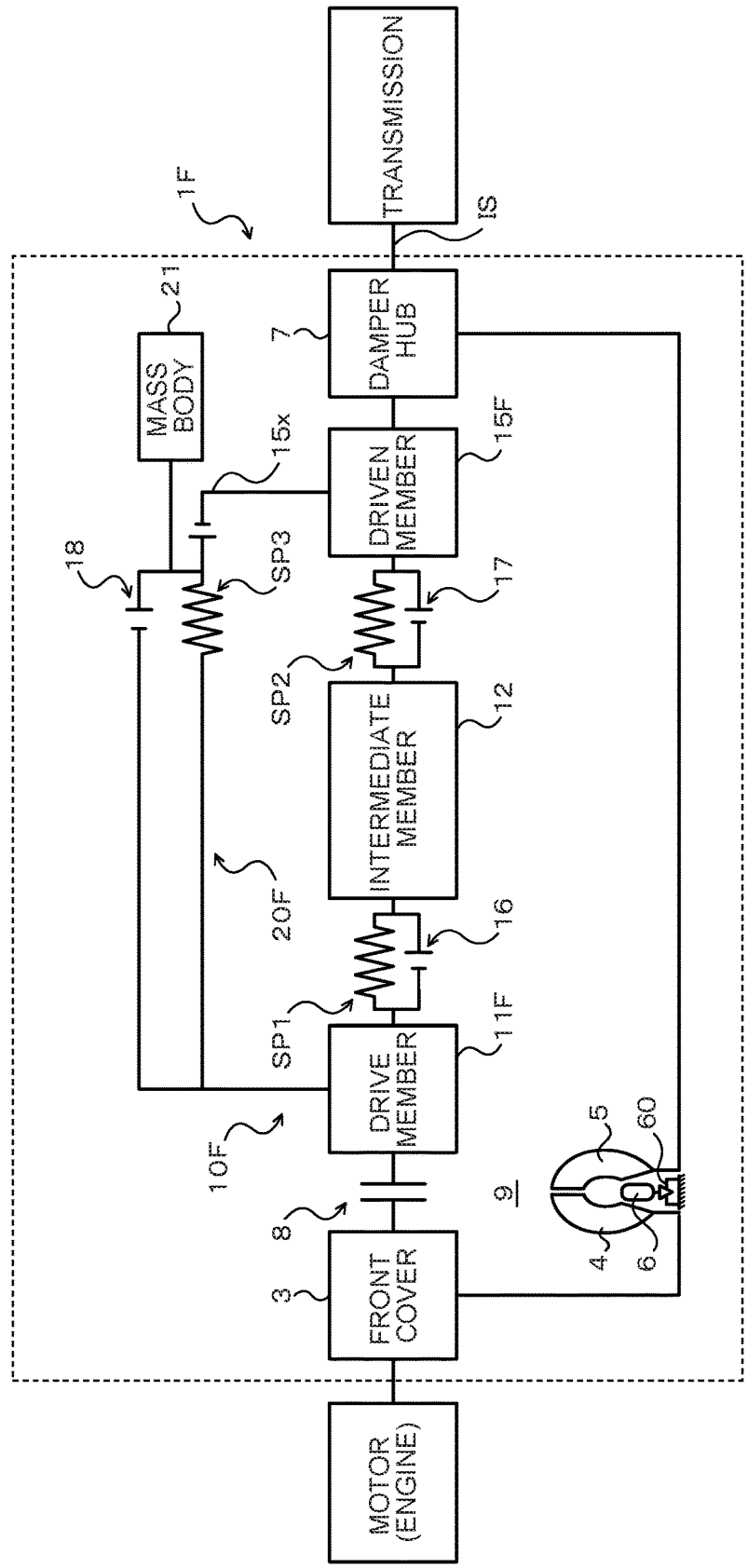
FIG. 12 is a schematic configuration diagram illustrating a starting device that includes a damper device according to another embodiment.

FIG. 12 is a schematic configuration diagram illustrating a starting device IF that includes a damper device 10F according to still another embodiment of the present disclosure. Constituent elements of the starting device IF that are identical to the elements of the starting device 1 etc. discussed above are given the same reference numerals to omit redundant descriptions.

In the damper device 10F illustrated in FIG. 12, a dynamic damper 20F is coupled to a drive member 11F (first rotary element), and a driven member 15F (second rotary element) is provided with additional abutment portions 15x that abut against the vibration absorption springs SP3. In the damper device 10F, in addition, the first and second inter-element stoppers 16 and 17 are configured such that one of the first and second inter-element stoppers 16 and 17 restrict relative rotation between two corresponding rotary elements earlier than the other. Further, the additional abutment portions 15x of the driven member 15F are configured to abut against end portions of the corresponding vibration absorption springs SP3 before relative rotation between two rotary elements is restricted by the other of the first and second inter-element stoppers 16 and 17 and at the same time as relative rotation between two rotary elements is restricted by the one of the first and inter-element stoppers 16 and 17.

In the case where the first inter-element stoppers 16 restrict relative rotation between two rotary elements earlier, the torsional angle corresponding to the angle of rotation of the drive member 11F with respect to the driven member 15F made before the additional abutment portions 15x abut against end portions of the vibration absorption springs SP3 is defined as "θd", and the torsional angle of the outer springs SP1 corresponding to the angle of rotation of the drive member 11F with respect to the intermediate member 12 made before relative rotation is restricted by the first inter-element stoppers 16 is defined as "θ1". Then, a relationship θd=θ1+θ1×k1/k2, that is, θd=θ1×(k1+k2)/k2, is established. In the case where the second inter-element stoppers 17 restrict relative rotation between two rotary elements earlier, meanwhile, the torsional angle corresponding to the angle of rotation of the drive member 11F with respect to the driven member 15F made before the additional abutment portions 15x abut against end portions of the vibration absorption springs SP3 is defined as "θd", and the torsional angle of the inner springs SP2 corresponding to the angle of rotation of the intermediate member 12 with respect to the driven member 15F made before relative rotation is restricted by the second inter-element stoppers 17 is defined as "θ2". Then, a relationship θd=θ2+θ2×k2/k1, that is, θd=θ2×(k1+k2)/k1, is established.

Consequently, in the damper device 10F which includes the dynamic damper 20F which is coupled to the drive member 11F which serves as a first rotary element, when the additional abutment portions 15x of the driven member 15F which serves as a second rotary element abut against end portions of the corresponding vibration absorption springs SP3 of the dynamic damper 20F, the vibration absorption springs SP3 function as elastic bodies that transfer torque between the drive member 11F and the driven member 15F. As a result, in the damper device 10F, the rigidity of one of the outer springs SP1 and the inner springs SP2, which do not transfer torque after the additional abutment portions 15x are coupled to the vibration absorption springs SP3, can be further lowered, and torque to be carried by (distributed to) the other of the outer springs SP1 and the inner springs SP2 which act in parallel with the vibration absorption springs SP3 can be reduced to further lower the rigidity of the other of the outer springs SP1 and the inner springs SP2. Thus, it is possible to further lower the rigidity of the damper device 10F which has the dynamic damper 20F.

In addition, the additional abutment portions 15x of the driven member 15F abut against end portions of the vibration absorption springs SP3 before relative rotation between the drive member 11F and the intermediate member 12 is restricted by the first inter-element stoppers 16 or before relative rotation between the intermediate member 12 and the driven member 15F is restricted by the second inter-element stoppers 17. Consequently, the vibration absorption springs SP3 can be caused to act in parallel with one of the outer springs SP1 and the inner springs SP2. Thus, it is possible to allow input of higher torque to the drive member 11F after the additional abutment portions 15x abut against end portions of the corresponding vibration absorption springs SP3 while lowering the rigidity of the entire damper device 10F.

In the damper device 10F, further, the angle of rotation of the drive member 11F with respect to the driven member 15F made before the additional abutment portions 15x abut against end portions of the vibration absorption springs SP3 is determined to be smaller than the angle of rotation of the drive member 11F with respect to the driven member 15F made before relative rotation is restricted by the first and second inter-element stoppers 16 and 17. Consequently, it is possible to cause the additional abutment portions 15x of the driven member 15F to abut against end portions of the vibration absorption springs SP3 before relative rotation between the drive member 11F and the driven member 15F is restricted by the first and second inter-element stoppers 16 and 17 which serve as the rotation restriction stoppers.

In addition, the additional abutment portions 15x of the driven member 15F abut against end portions of the corresponding vibration absorption springs SP3 when torque input to the drive member 11F becomes equal to or more than the predetermined value (first value) which is smaller than the torque which corresponds to the maximum torsional angle of the damper device 10F. In this way, by causing the vibration absorption springs SP3 to function as elastic bodies that transfer torque between the drive member 11F and the driven member 15F when torque input to the drive member 11F has been increased, it is possible to further lower the rigidity of at least one of the outer springs SP1 and the inner springs SP2.

Further, the additional abutment portions 15x of the driven member 15F abut against end portions of the corresponding vibration absorption springs SP3 at the same time as relative rotation between two rotary elements is restricted by one of the first and second inter-element stoppers 16 and 17 that operate earlier. Consequently, it is possible to provide the damper device 10F with two-stage torsional characteristics while lowering the rigidity of the entire damper device 10F. It should be noted, however, that the additional abutment portions 15x and the first and second inter-element stoppers 16 and 17 may be configured such that relative rotation between two rotary elements is restricted by one of the first and second inter-element stoppers 16 and 17 that operate earlier after the additional abutment portions 15x abut against end portions of the corresponding vibration absorption springs SP3. Consequently, it is possible to provide the damper device 10F with three-stage torsional characteristics by adjusting the rigidity (spring constant) of the outer springs SP1, the inner springs SP2, and the vibration absorption springs SP3. In the damper device 10F, in addition, the vibration absorption springs SP3 may be disposed side by side in the circumferential direction with one of the outer springs SP1 and the inner springs SP2.

Figure 13:
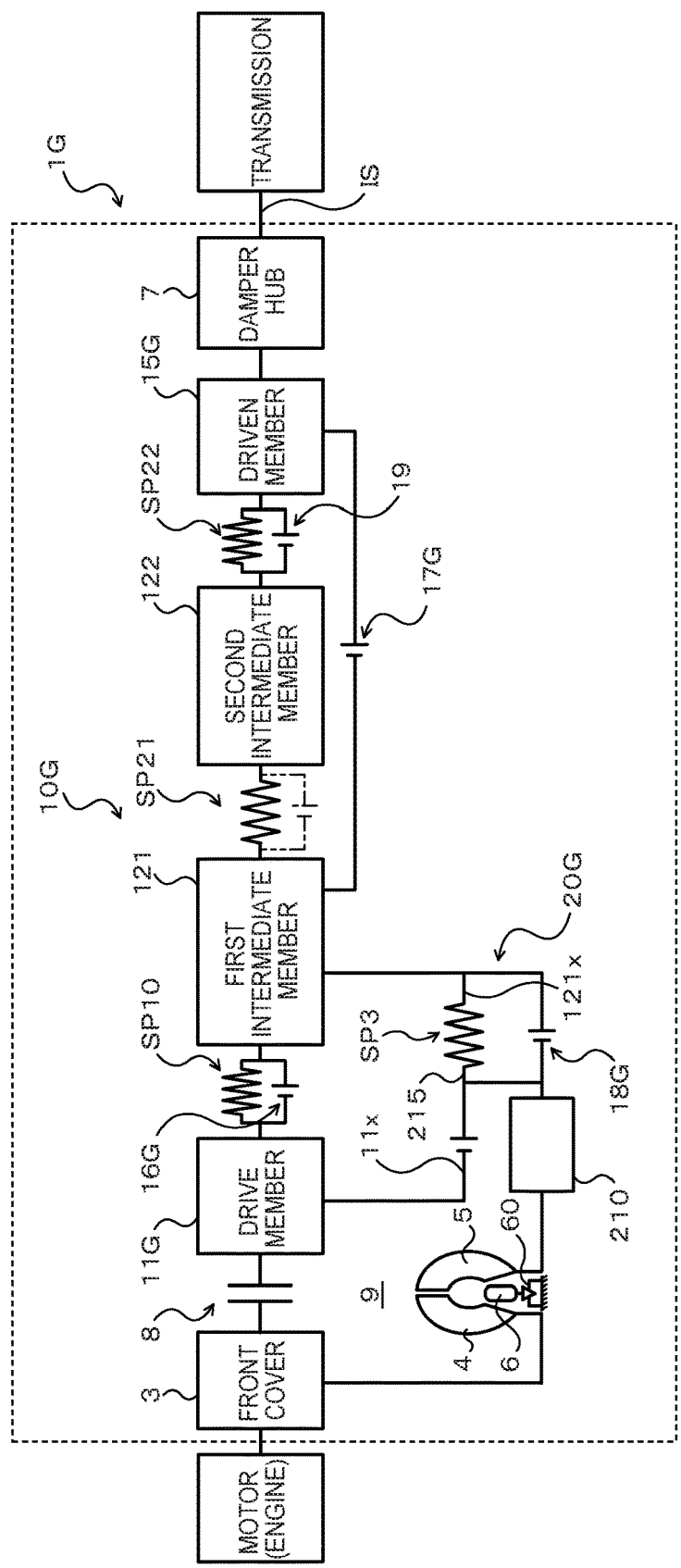
FIG. 13 is a schematic configuration diagram illustrating a starting device that includes a damper device according to still another embodiment.

FIG. 13 is a schematic configuration diagram illustrating a starting device 1G that includes a damper device 10G according to still another embodiment of the present disclosure. Constituent elements of the starting device 1G that are identical to the elements of the starting device 1 etc. discussed above are given the same reference numerals to omit redundant descriptions.

The damper device 10G illustrated in FIG. 13 includes, as rotary elements, a drive member (input element) 11G, a first intermediate member (first intermediate element) 121, a second intermediate member (second intermediate element) 122, and a driven member (output element) 15G. The damper device 10G further includes, as torque transfer elements (torque transfer elastic bodies), a plurality of (in the embodiment, two, for example) outer springs SP10 (first elastic bodies) disposed in proximity to the outer periphery of the damper device 10G, and a plurality of (in the embodiment, three, for example) first inner springs SP21 (second elastic bodies) and second inner springs SP22 (third elastic bodies) disposed on the inner side with respect to the outer springs SP10, the number of the first inner springs SP21 and the number of the second inner springs SP22 being the same as each other.

The outer springs SP10 of the damper device 10G are arc coil springs made of a metal material wound so as to have an axis that extends in an arc shape when no load is applied. Consequently, the outer springs SP10 are provided with lower rigidity (a smaller spring constant), and the damper device 10G is provided with lower rigidity (a longer stroke). In addition, the first and second inner springs SP21 and SP22 of the damper device 10G are linear coil springs made of a metal material spirally wound so as to have an axis that extends straight when no load is applied, and have higher rigidity (a larger spring constant) than that of the outer springs SP10. In the example of FIG. 13, springs that have different specifications (such as rigidity, that is, spring constant) are adopted as the first and second inner springs SP21 and SP22. It should be noted, however, that the specifications of the first and second inner springs SP21 and SP22 may be the same as each other.

The damper device 10G further includes, as rotation restriction stoppers that restrict relative rotation between the drive member 11G and the driven member 15G: a first inter-element stopper 16G that restricts relative rotation between the drive member 11G and the first intermediate member 121; a second inter-element stopper 17G (elastic body stopper) that restricts relative rotation between the first intermediate member 121 and the driven member 15G; and a third inter-element stopper 19 (second elastic body stopper) that restricts relative rotation between the second intermediate member 122 and the driven member 15G. In the embodiment, the first inter-element stopper 16G (the specifications of the drive member 11G, the first intermediate member 121, the outer springs SP10, and so forth), the second inter-element stopper 17G (the specifications of the first intermediate member 121, the driven member 15G, the first inner springs SP21, and so forth), and the third inter-element stopper 19 (the specifications of the second intermediate member 122, the driven member 15G, the second inner springs SP22, and so forth) are configured (set) such that the third inter-element stopper 19, the second inter-element stopper 17G, and the first inter-element stopper 16G operate in this order as torque transferred to the front cover 3, that is, torque input to the drive member 11G, is increased.

Figure 14:
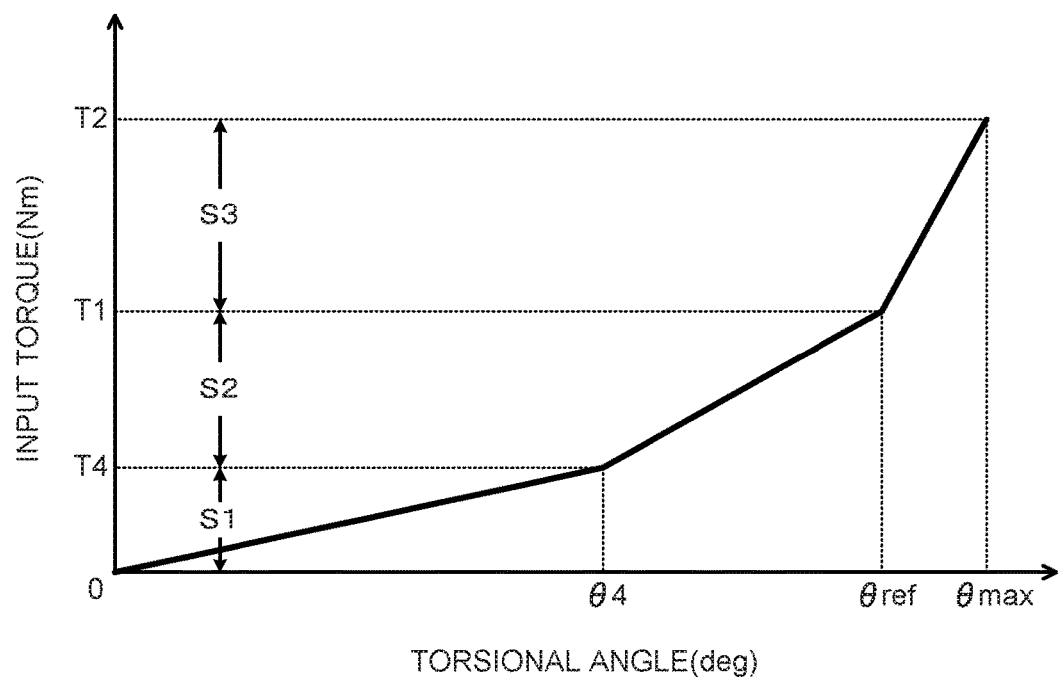
FIG. 14 is a chart illustrating an example of the torsional characteristics of the damper device which is included in the starting device of FIG. 13.

That is, in the damper device 10G, when torque input to the drive member 11G reaches torque (fourth value) T4 that is smaller than torque T2 (second value) that corresponds to the maximum torsional angle θ max of the damper device 10G, torsion (expansion and contraction) of the second inner springs SP22 and relative rotation between the second intermediate member 122 and the driven member 15G are restricted by the third inter-element stopper 19. In addition, when torque input to the drive member 11G reaches a predetermined value T1 (first value) that is smaller than the torque T2 of the damper device 10G and larger than the torque T4, torsion (expansion and contraction) of the first inner springs SP21 and relative rotation between the first intermediate member 121 and the driven member 15G are restricted by the second inter-element stopper 17G. Further, when torque input to the drive member 11G reaches the torque T2, torsion (expansion and contraction) of the outer springs SP1 and relative rotation between the drive member 11G and the first intermediate member 121, that is, relative rotation between the drive member 11G and the driven member 15G, are restricted by the first inter-element stopper 16G. Consequently, as illustrated in FIG. 14, the damper device 10G has three-stage torsional characteristics.

The dynamic damper 20G includes, as mass bodies, a coupling member 210 configured in the same manner as the mass body 21 discussed above, and the turbine runner 5 which is coupled so as to rotate together with the coupling member 210. In addition, a plurality of vibration absorption springs (vibration absorption elastic bodies) SP3 that are linear coil springs or arc coil springs (in the example of FIG. 13, two linear coil springs, for example) are disposed between the coupling member 210 and the first intermediate member 121 (first rotary element) which is a rotary element of the damper device 10G. Further, the dynamic damper 20G (damper device 10G) includes an inter-element stopper 18G that restricts relative rotation between the coupling member 210 and the first intermediate member 121.

In addition, the coupling member 210 has a plurality of (in the embodiment, four, for example) spring abutment portions (elastic body abutment portions) 215. With the damper device 10 attached, the vibration absorption springs SP3 are each supported by a pair of spring abutment portions 215, and each disposed between two outer springs SP10 which are adjacent to each other so as to be arranged side by side with the outer springs SP10 in the circumferential direction. Further, the first intermediate member 121 has a plurality of (in the embodiment, four, for example) spring abutment portions 121x that abut against both end portions of the vibration absorption springs SP3 with the damper device 10G attached. In addition, the drive member 11G (second rotary element) which is a rotary element to which the dynamic damper 20G is not coupled is provided with additional abutment portions 11x that abut against end portions of the vibration absorption springs SP3 before relative rotation between the drive member 11G and the driven member 15G is restricted by the first, second, and third inter-element stoppers 16G, 17G, and 19.

In the damper device 10G configured as discussed above, when lock-up is established by the lock-up clutch 8, torque from the engine is transferred to the input shaft IS of the speed change device via a path that includes the front cover 3, the lock-up clutch 8, the drive member 11G, the outer springs SP10, the first intermediate member 121, the first inner springs SP21, the second intermediate member 122, the second inner springs SP22, the driven member 15G, and the damper hub 7. In this event, fluctuations in torque input to the front cover 3 are mainly damped (absorbed) by the outer springs SP10 and the first and second inner springs SP21 and SP22 of the damper device 10 which act in series. Thus, in the starting device 1G, when lock-up is established by the lock-up clutch 8, fluctuations in torque input to the front cover 3 can be damped (absorbed) well by the damper device 10G.

The combined spring constant of the plurality of outer springs SP10 which act in parallel between the drive member 11G and the first intermediate member 121 is defined as "k10". The combined spring constant of the plurality of first inner springs SP21 which act in parallel between the first intermediate member 121 and the second intermediate member 122 is defined as "k21". The combined spring constant of the plurality of second inner springs SP22 which act in parallel between the second intermediate member 122 and the driven member 15G is defined as "k22". In this case, the combined spring constant K of the entire damper device 10G is $K=Kf=k10 \cdot k21 \cdot k22/(k10 \cdot k21+k10 \cdot k22+k21 \cdot k22)$ during a period (first stage S1) from the start of transfer of torque from the engine to the front cover 3 until torque input to the drive member 11G reaches the torque T4 so that the torsional angle of the damper device 10G is brought to an angle θ4 and relative rotation between the second intermediate member 122 and the driven member 15G is restricted by the third inter-element stoppers 19. Further, the combined spring constant K of the entire damper device 10G is $K=Ks=k10 \cdot k21/(k10+k21)$ during a period (second stage S2) after the torsional angle of the damper device 10G is brought to the angle θ4 until the torsional angle of the damper device 10G is brought to the predetermined angle θref (θref<θ4) so that relative rotation between the first intermediate member 121 and the driven member 15G (second intermediate member 122) is restricted by the second inter-element stopper 17G.

In addition, when the first intermediate member 121 is rotated by torque from the engine along with rotation of the engine when lock-up is established, some (two) of the spring abutment portions 121x press first ends of the corresponding vibration absorption springs SP3, and second ends of the vibration absorption springs SP3 press one of the corresponding pair of spring abutment portions 215 of the coupling member 210. As a result, the dynamic damper 20G which includes the turbine runner 5 and the coupling member 210 which serve as mass bodies and the plurality of vibration absorption springs SP3 is coupled to the first intermediate member 121 of the damper device 10G. Consequently, in the starting device 1G, vibration from the engine can also be damped (absorbed) by the dynamic damper 20G. More particularly, the overall level of the vibration can be lowered while providing the vibration with two separate peaks. By coupling the coupling member 210 so as to rotate together with the turbine runner 5, the turbine runner 5 which does not contribute to torque transfer between the front cover 3 and the input shaft IS of the transmission when lock-up is established can be used as a mass body of the dynamic damper 20G. Thus, it is possible to further improve the vibration damping performance by increasing the weight of the mass body of the dynamic damper 20G while suppressing an increase in size of the starting device 1G.

In the damper device 10G further, the drive member 11G and the first intermediate member 121 rotate relative to each other and the first intermediate member 121 and the driven member 15G rotate relative to each other in accordance with the magnitude of torque input to the drive member 11G. In the embodiment, when torque input to the drive member 11G reaches the predetermined value T1, torsion of the first and second inner springs SP21 and SP22 and relative rotation between the first intermediate member 121 and the driven member 15G are restricted by the second inter-element stopper 17G, and, substantially at the same time, the additional abutment portions 11x of the drive member 11G abut against end portions of the corresponding vibration absorption springs SP3 so that the drive member 11G is coupled to the vibration absorption springs SP3.

When the additional abutment portions 11x of the drive member 11G abut against end portions of the corresponding vibration absorption springs SP3, the vibration absorption springs SP3 function as elastic bodies that act in parallel with the corresponding outer springs SP10 to transfer torque between the drive member 11G and the first intermediate member 121. Consequently, after torsion of the first and second inner springs SP21 and SP22 and relative rotation between the first intermediate member 121 and the driven member 15G are restricted by the second inter-element stopper 17, torque from the engine which serves as a motor is transferred to the input shaft IS of the speed change device via a path that includes the front cover 3, the lock-up clutch 8, the drive member 11G, the outer springs SP10 and the vibration absorption springs SP3 which act in parallel, the first intermediate member 121, the first inner springs SP21, torsion of which has been restricted, the second intermediate member 122, the second inner springs SP22, torsion of which has been restricted, the third inter-element stoppers 19, the second inter-element stopper 17G which is arranged in parallel therewith, the driven member 15G, and the damper hub 7.

In this event, fluctuations in torque input to the front cover 3 are damped (absorbed) by the outer springs SP10 and the vibration absorption springs SP3 of the damper device 10G which act in parallel. That is, when the combined spring constant of the plurality of vibration absorption springs SP3 which act in parallel between the drive member 11G and the first intermediate member 121 is defined as "k3", the combined spring constant K of the entire damper device 10G is K=Kt=k10+k3>Kf. Ks during a period (third stage S3) after relative rotation between the first intermediate member 121 and the driven member 15G is restricted by the second inter-element stopper 17G until torque input to the drive member 11G reaches the value T2 so that the torsional angle of the damper device 10G is brought to the maximum torsional angle θ max and relative rotation between the drive member 11G and the first intermediate member 121 is restricted by the first inter-element stopper 16G.

As a result, also in the damper device 10G of the starting device 1, the rigidity of the first inner springs SP21, which do not transfer torque after the additional abutment portions 11x are coupled to the vibration absorption springs SP3, can be further lowered, and torque to be carried by (distributed to) the outer springs SP10 which act in parallel with the vibration absorption springs SP3 can be reduced to lower the rigidity of the outer springs SP10. Thus, it is possible to further lower the rigidity of the damper device 10G which has the dynamic damper 20G. In the damper device 10G, in addition, the additional abutment portions 11x of the drive member 11G abut against end portions of the corresponding vibration absorption springs SP3 before relative rotation between the drive member 11G and the first intermediate member 121 is restricted by the first inter-element stopper 16G along with an increase in input torque. Consequently, the outer springs SP10 which are provided between the drive member 11G and the first intermediate member 121 and the vibration absorption springs SP3 can be caused to act in parallel. Thus, it is possible to allow input of higher torque to the drive member 11G after the additional abutment portions 11x abut against end portions of the corresponding vibration absorption springs SP3 while lowering the rigidity of the entire damper device 10G. By providing the damper device 10G with three-stage characteristics, further, the difference in spring constant between the first and second stages S1 and S2 and the difference in spring constant between the second and third stages S2 and S3 can be reduced. Consequently, non-linearity can be reduced, and torque fluctuations (vibration) can be damped well by the damper device 10G even if the input torque is fluctuated (vibrated) around the torque T1 or T4 which serves as a threshold.

Figure 15:
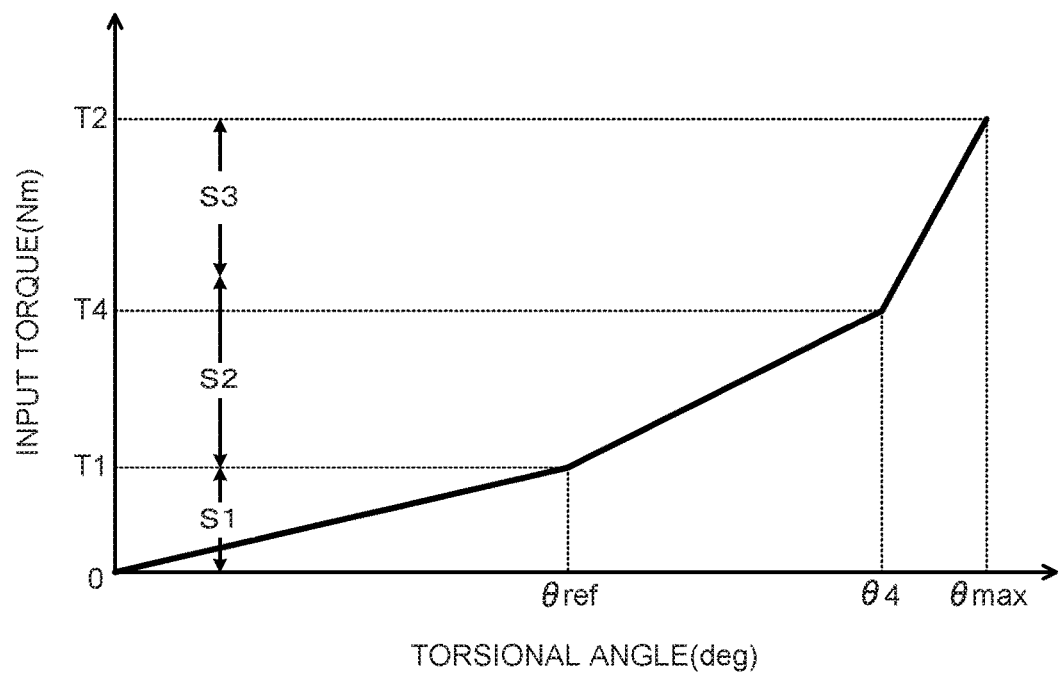
FIG. 15 is a chart illustrating another example of the torsional characteristics of the damper device which is included in the starting device of FIG. 13.

In the damper device 10G illustrated in FIG. 13, in addition, the second inter-element stopper 17G (which corresponds to "second elastic body stopper" in this case) which restricts torsion of the first inner springs SP21 (which correspond to "third elastic bodies" in this case) may be configured to restrict relative rotation between the first and second intermediate members 121 and 122 as indicated by the dash-double-dot line in the drawing. In this case, further, the predetermined value T1 (first value) may be determined to be smaller than the torque T4 (fourth value) (and θref<θ4), and the third inter-element stopper 19 (which corresponds to "elastic body stopper" in this case) may be configured to restrict torsion of the second inner springs SP22 (which correspond to "second elastic bodies" in this case) substantially at the same time as the input torque is brought to the predetermined value T1 so that the additional abutment portions 11x abut against end portions of the corresponding vibration absorption springs SP3. Also by adopting such a configuration, the damper device 10G can be provided with three-stage torsional characteristics as illustrated in FIG. 15. In this case, the outer springs SP10 and the vibration absorption springs SP3 which act in parallel with each other and the first inner springs SP21 act in series during a period (second stage S2) after the torsional angle of the damper device 10G is brought to the predetermined angle θref until relative rotation between the first and second intermediate members 121 and 122 is restricted by the second inter-element stopper 17G. The combined spring constant K of the entire damper device 10G in the second stage S2 is K=Ks={k21·(k10+k3)}/(k10+k21+k3).

The dynamic damper 20 to 20F of the damper device 10 to 10F may be configured to include the turbine runner 5 as a mass body. In this case, the mass body 21 discussed above may be altered so as to function as a coupling member that couples the vibration absorption springs SP3 and the turbine runner 5 to each other. In addition, the damper device 10 to 10F may be configured to include a plurality of intermediate members (intermediate elements), a torque transfer elastic body disposed between the drive member and one of the plurality of intermediate members, and a torque transfer elastic body that has rigidity that is the same as or different from that of the torque transfer elastic body and that is disposed between the plurality of intermediate members. Further, the damper device 10 to 10F may be configured not to include the intermediate member 12 etc. In the damper device 10 to 10G, the additional abutment portions 113x, 11x, 12x, 15x are all configured to directly abut against the corresponding end portions of the vibration absorption springs SP3. However, the present disclosure is not limited thereto. That is, the additional abutment portions 113x, 11x, 12x, 15x may be configured to be coupled to the corresponding end portions of the vibration absorption springs SP3 (indirectly) via other spring abutment portions (tab portions, e.g. the spring abutment portions 215 of the coupling member 210) or the like. Further, the starting device 1 to 1G may be configured not to include a fluid transmission apparatus.

As has been described above, the damper device 10 to 10G includes a plurality of rotary elements that include at least an input element (drive member 11) and an output element (driven member 15), torque transfer elastic bodies SP1, SP2 that include at least first and second elastic bodies SP1, SP2 that act in series between the input element (drive member 11) and the output element (driven member 15) to transfer torque, and a dynamic damper 20 that includes a mass body 21 and a vibration absorption elastic body disposed between the mass body 21 and a first rotary element that is one of the plurality of rotary elements and that damps vibration by applying vibration in the opposite phase to the first rotary element; the damper device 10 to 10G including a rotation restriction stopper that restricts relative rotation between the input element (drive member 11) and the output element (driven member 15), an additional coupling portion provided to a second rotary element that is one of the plurality of rotary elements to which the dynamic damper 20 is not coupled and configured to be coupled to an end portion of the vibration absorption elastic body before relative rotation between the input element (drive member 11) and the output element (driven member 15) is restricted by the rotation restriction stopper, and an elastic body stopper that restricts torsion of one of the first and second elastic bodies SP1, SP2 before relative rotation between the input element (drive member 11) and the output element (driven member 15) is restricted by the rotation restriction stopper and at least by the time when the additional coupling portion is coupled to the end portion of the vibration absorption elastic body; and the vibration absorption elastic body and the other of the first and second elastic bodies SP1, SP2 act in parallel between the input element (drive member 11) and the output element (driven member 15) to transfer torque after the additional coupling portion is coupled to the end portion of the vibration absorption elastic body.

That is, in the damper device 10 to 10G, the dynamic damper 20 which includes the mass body 21 and the vibration absorption elastic body which is disposed between the mass body 21 and the first rotary element which is one of the plurality of rotary elements is coupled to the first rotary element. In addition, the second rotary element which is one of the plurality of rotary elements to which the dynamic damper 20 is not coupled has the additional coupling portion which is configured to be coupled to an end portion of the vibration absorption elastic body before relative rotation between the input element (drive member 11) and the output element (driven member 15) is restricted by the rotation restriction stopper. The damper device 10 to 10G further has the elastic body stopper which restricts torsion of one of the first and second elastic bodies SP1, SP2 before relative rotation between the input element (drive member 11) and the output element (driven member 15) is restricted by the rotation restriction stopper and at least by the time when the additional coupling portion is coupled to the end portion of the vibration absorption elastic body. The vibration absorption elastic body and the other of the first and second elastic bodies SP1, SP2 act in parallel between the input element (drive member 11) and the output element (driven member 15) to transfer torque after the additional coupling portion is coupled to the end portion of the vibration absorption elastic body. Consequently, the rigidity of the one of the first and second elastic bodies SP1, SP2, which does not transfer torque at least after the additional abutment portion is coupled to the end portion of the vibration absorption elastic body, can be further lowered, and torque to be carried by (distributed to) the other of the first and second elastic bodies SP1, SP2 which acts in parallel with the vibration absorption elastic body can be reduced to further lower the rigidity of the other of the first and second elastic bodies SP1, SP2. Thus, it is possible to further lower the rigidity of the damper device 10 to 10G which has the dynamic damper 20.

In addition, the additional coupling portion may be coupled to the end portion of the vibration absorption elastic body when torque input to the input element (drive member 11) becomes equal to or more than a first value determined in advance. In this way, by causing the vibration absorption elastic body to function as an elastic body that transfers torque between the first rotary element and the second rotary element when torque input to the input element (drive member 11) has been increased, it is possible to further lower the rigidity of the torque transfer elastic bodies SP1, SP2.

In this case, the rotation restriction stopper may restrict relative rotation between the input element (drive member 11) and the output element (driven member 15) when the torque input to the input element (drive member 11) reaches a second value determined in advance, and the first value may be smaller than the second value.

Further, the elastic body stopper may restrict torsion of the one of the first and second elastic bodies SP1, SP2 when the torque input to the input element (drive member 11) reaches the first value. Consequently, it is possible to provide the damper device 10 to 10G with torsional characteristics with two stages or more while lowering the rigidity of the entire damper device 10 to 10G.

In addition, the elastic body stopper may restrict torsion of the one of the first and second elastic bodies SP1, SP2 when the torque input to the input element (drive member 11) reaches a third value determined in advance, and the third value may be smaller than the first value. Consequently, it is possible to provide the damper device 10 to 10G which includes only the first and second elastic bodies SP1, SP2 as torque transfer elastic bodies SP1, SP2 with three-stage torsional characteristics.

Further, an angle of rotation of the second rotary element with respect to the first rotary element made before the additional coupling portion is coupled to the end portion of the vibration absorption elastic body may be smaller than an angle of rotation of the input element (drive member 11) with respect to the output element (driven member 15) made before the relative rotation is restricted by the rotation restriction stopper. Consequently, it is possible to couple the additional coupling portion of the second rotary element to the end portion of the vibration absorption elastic body before relative rotation between the input element (drive member 11) and the output element (driven member 15) is restricted by the rotation restriction stopper.

In addition, the rotation restriction stopper may include an inter-element stopper that restricts relative rotation between the first and second rotary elements; and the additional coupling portion may be configured to be coupled to the end portion of the vibration absorption elastic body before relative rotation between the first and second rotary elements is restricted by the inter-element stopper. Consequently, the torque transfer elastic body which is provided between the first and second rotary elements and the vibration absorption elastic body can be caused to act in parallel. Thus, it is possible to allow input of higher torque to the input element (drive member 11) while lowering the rigidity of the entire damper device 10 to 10G.

In the damper device 10 to 10G, further, the plurality of rotary elements may include at least one intermediate element disposed between the input element (drive member 11) and the output element (driven member 15) via the torque transfer elastic bodies SP1, SP2; and the first rotary element may be the intermediate element, and the second rotary element may be the input element (drive member 11) or a rotary element disposed between the input element (drive member 11) and the first rotary element via the torque transfer elastic bodies SP1, SP2.

In the damper device 10 to 10G, in addition, the plurality of rotary elements may include at least one intermediate element disposed between the input element (drive member 11) and the output element (driven member 15) via the torque transfer elastic bodies SP1, SP2; and the first rotary element may be the intermediate element, and the second rotary element may be the output element (driven member 15) or a rotary element disposed between the first rotary element and the output element (driven member 15) via the torque transfer elastic bodies SP1, SP2.

Further, the first rotary element may be the output element (driven member 15), and the second rotary element may be the input element (drive member 11) or a rotary element disposed between the input element (drive member 11) and the output element (driven member 15) via the torque transfer elastic bodies SP1, SP2.

In addition, the first rotary element may be the input element (drive member 11), and the second rotary element may be the output element (driven member 15) or a rotary element disposed between the input element (drive member 11) and the output element (driven member 15) via the torque transfer elastic bodies SP1, SP2.

Further, the mass body 21 of the dynamic damper 20 may include a turbine runner that constitutes a fluid transmission apparatus together with a pump impeller.

In addition, the plurality of rotary elements may include first and second intermediate elements; the torque transfer elastic bodies SP1, SP2 may include the first elastic body that transfers torque between the input element (drive member 11) and the first intermediate element, the second elastic body that transfers torque between the first intermediate element and the second intermediate element, and a third elastic body that transfers torque between the second intermediate element and the output element (driven member 15); and the damper device 10 to 10G may further include a second elastic body stopper that restricts torsion of the third elastic body when the torque input to the input element (drive member 11) reaches a fourth value determined in advance, and the fourth value may be smaller than the first value.

Further, the plurality of rotary elements may include first and second intermediate elements; the torque transfer elastic bodies SP1, SP2 may include the first elastic body that transfers torque between the input element (drive member 11) and the first intermediate element, the second elastic body that transfers torque between the second intermediate element and the output element (driven member 15), and a third elastic body that transfers torque between the first intermediate element and the second intermediate element; and the damper device 10 to 10G may further include a second elastic body stopper that restricts torsion of the third elastic body when the torque input to the input element (drive member 11) reaches a fourth value determined in advance, and the fourth value may be larger than the first value.

In addition, the first rotary element may be the first intermediate element, and the second rotary element may be the input element (drive member 11).

The present disclosure is not limited to the embodiments described above in any way, and it is a matter of course that the present disclosure may be modified in various ways within the broad scope of the present disclosure. Further, the mode for carrying out the present disclosure described above is merely a specific form of the disclosure described in the "SUMMARY" section, and does not limit the elements of the invention described in the "SUMMARY" section.

INDUSTRIAL APPLICABILITY

The present disclosure can be utilized, for example, in the field of manufacture of damper devices or the like.

The invention claimed is:
1. A damper device that includes a plurality of rotary elements that include at least an input element and an output element, torque transfer elastic bodies that include at least first and second elastic bodies that act in series between the input element and the output element to transfer torque, and a dynamic damper that includes a mass body and a vibration absorption elastic body disposed between the mass body and a first rotary element that is one of the plurality of rotary elements and that damps vibration by applying vibration in the opposite phase to the first rotary element, comprising:
   a rotation restriction stopper that restricts relative rotation between the input element and the output element;
   an additional coupling portion provided to a second rotary element that is one of the plurality of rotary elements to which the dynamic damper is not coupled and configured to be coupled to an end portion of the vibration absorption elastic body before relative rotation between the input element and the output element is restricted by the rotation restriction stopper; and
   an elastic body stopper that restricts torsion of one of the first and second elastic bodies before relative rotation between the input element and the output element is restricted by the rotation restriction stopper and at least by the time when the additional coupling portion is coupled to the end portion of the vibration absorption elastic body, wherein
   the vibration absorption elastic body and the other of the first and second elastic bodies act in parallel between the input element and the output element to transfer torque after the additional coupling portion is coupled to the end portion of the vibration absorption elastic body.

2. The damper device according to claim 1, wherein
   the additional coupling portion is coupled to the end portion of the vibration absorption elastic body when torque input to the input element becomes equal to or more than a first value determined in advance.

3. The damper device according to claim 2, wherein
   the rotation restriction stopper restricts relative rotation between the input element and the output element when the torque input to the input element reaches a second value determined in advance, and the first value is smaller than the second value.

4. The damper device according to claim 3, wherein
the elastic body stopper restricts torsion of the one of the first and second elastic bodies when the torque input to the input element reaches the first value.

5. The damper device according to claim 4, wherein
the plurality of rotary elements include first and second intermediate elements;
the torque transfer elastic bodies include the first elastic body that transfers torque between the input element and the first intermediate element, the second elastic body that transfers torque between the first intermediate element and the second intermediate element, and a third elastic body that transfers torque between the second intermediate element and the output element; and
the damper device further includes a second elastic body stopper that restricts torsion of the third elastic body when the torque input to the input element reaches a fourth value determined in advance, and the fourth value is smaller than the first value.

6. The damper device according to claim 5, wherein
the first rotary element is the first intermediate element, and the second rotary element is the input element.

7. The damper device according to claim 4, wherein
the plurality of rotary elements include first and second intermediate elements;
the torque transfer elastic bodies include the first elastic body that transfers torque between the input element and the first intermediate element, the second elastic body that transfers torque between the second intermediate element and the output element, and a third elastic body that transfers torque between the first intermediate element and the second intermediate element; and
the damper device further includes a second elastic body stopper that restricts torsion of the third elastic body when the torque input to the input element reaches a fourth value determined in advance, and the fourth value is larger than the first value.

8. The damper device according to claim 7, wherein
the first rotary element is the first intermediate element, and the second rotary element is the input element.

9. The damper device according to claim 3, wherein
the elastic body stopper restricts torsion of the one of the first and second elastic bodies when the torque input to the input element reaches a third value determined in advance, and the third value is smaller than the first value.

10. The damper device according to claim 2, wherein
an angle of rotation of the second rotary element with respect to the first rotary element made before the additional coupling portion is coupled to the end portion of the vibration absorption elastic body is smaller than an angle of rotation of the input element with respect to the output element made before the relative rotation is restricted by the rotation restriction stopper.

11. The damper device according to claim 2, wherein
the rotation restriction stopper includes an inter-element stopper that restricts relative rotation between the first and second rotary elements; and
the additional coupling portion is configured to be coupled to the end portion of the vibration absorption elastic body before relative rotation between the first and second rotary elements is restricted by the inter-element stopper.

12. The damper device according to claim 2, wherein
the plurality of rotary elements include at least one intermediate element disposed between the input element and the output element via the torque transfer elastic bodies; and
the first rotary element is the intermediate element, and the second rotary element is the input element or a rotary element disposed between the input element and the first rotary element via the torque transfer elastic bodies.

13. The damper device according to claim 2, wherein
the plurality of rotary elements include at least one intermediate element disposed between the input element and the output element via the torque transfer elastic bodies; and
the first rotary element is the intermediate element, and the second rotary element is the output element or a rotary element disposed between the first rotary element and the output element via the torque transfer elastic bodies.

14. The damper device according to claim 1, wherein
an angle of rotation of the second rotary element with respect to the first rotary element made before the additional coupling portion is coupled to the end portion of the vibration absorption elastic body is smaller than an angle of rotation of the input element with respect to the output element made before the relative rotation is restricted by the rotation restriction stopper.

15. The damper device according to claim 1, wherein
the rotation restriction stopper includes an inter-element stopper that restricts relative rotation between the first and second rotary elements; and
the additional coupling portion is configured to be coupled to the end portion of the vibration absorption elastic body before relative rotation between the first and second rotary elements is restricted by the inter-element stopper.

16. The damper device according to claim 1, wherein
the plurality of rotary elements include at least one intermediate element disposed between the input element and the output element via the torque transfer elastic bodies; and
the first rotary element is the intermediate element, and the second rotary element is the input element or a rotary element disposed between the input element and the first rotary element via the torque transfer elastic bodies.

17. The damper device according to claim 1, wherein
the plurality of rotary elements include at least one intermediate element disposed between the input element and the output element via the torque transfer elastic bodies; and
the first rotary element is the intermediate element, and the second rotary element is the output element or a rotary element disposed between the first rotary element and the output element via the torque transfer elastic bodies.

18. The damper device according to claim 1, wherein
the first rotary element is the output element, and the second rotary element is the input element or a rotary element disposed between the input element and the output element via the torque transfer elastic bodies.

19. The damper device according to claim 1, wherein
the first rotary element is the input element, and the second rotary element is the output element or a rotary element disposed between the input element and the output element via the torque transfer elastic bodies.

20. The damper device according to claim 1, wherein the mass body of the dynamic damper includes a turbine runner that constitutes a fluid transmission apparatus together with a pump impeller.

* * * * *